(12) United States Patent
Ball et al.

(10) Patent No.: US 11,545,817 B2
(45) Date of Patent: Jan. 3, 2023

(54) ELECTRICALLY CONDUCTIVE SURFACE AND A PROCESS FOR PRODUCING THE SAME

(71) Applicant: Quanta Associates, L.P., Houston, TX (US)

(72) Inventors: David James Ball, La Grange, TX (US); Jody Milton Greer, Houston, TX (US); David Karl Wabnegger, Burnaby (CA); Robert Wayne Palmer, Houston, TX (US)

(73) Assignee: Quanta Associates, L.P., Houston, TX (US)

( * ) Notice: Subject to any disclaimer, the term of this patent is extended or adjusted under 35 U.S.C. 154(b) by 411 days.

(21) Appl. No.: 16/634,419

(22) PCT Filed: Jul. 26, 2018

(86) PCT No.: PCT/US2018/043960
§ 371 (c)(1),
(2) Date: Jan. 27, 2020

(87) PCT Pub. No.: WO2019/023498
PCT Pub. Date: Jan. 31, 2019

(65) Prior Publication Data
US 2021/0098975 A1    Apr. 1, 2021

Related U.S. Application Data

(60) Provisional application No. 62/537,867, filed on Jul. 27, 2017.

(51) Int. Cl.
*H02G 1/04*    (2006.01)
*B32B 7/025*    (2019.01)
(Continued)

(52) U.S. Cl.
CPC .............. *H02G 1/04* (2013.01); *B32B 3/06* (2013.01); *B32B 5/024* (2013.01); *B32B 5/16* (2013.01);
(Continued)

(58) Field of Classification Search
CPC ..... B32B 15/043; B32B 15/046; B32B 15/06; B32B 15/08; B32B 15/09; B32B 15/10;
(Continued)

(56) References Cited

U.S. PATENT DOCUMENTS 2,639,650 A    5/1953    Robishaw
4,388,484 A    6/1983    York
(Continued)

FOREIGN PATENT DOCUMENTS

DE    2349378 A1    4/1975
EP    1727251 A2    11/2006
(Continued)

OTHER PUBLICATIONS

Thomas, Shane, PCT International Search Report of PCT/US2018/043960, dated Dec. 4, 2018, 5 pages, ISA/US, Alexandria, Virginia, United States of America.
(Continued)

*Primary Examiner* — Mark Kopec
*Assistant Examiner* — Jaison P Thomas
(74) *Attorney, Agent, or Firm* — Mark A. Oathout; Antony C. Edwards; Laura Tu

(57) ABSTRACT

Load-bearing apparatus/systems for location in the vicinity of energized power lines are provided. The apparatus includes a base member. The base member has an upper layer and a backing surface layer. An uppermost surface of the upper layer is adapted to support on it at least power line workers and/or related stringing equipment. At least the uppermost surface of the upper layer is adapted to be
(Continued)

electrically conductive. Methods for forming the apparatus are also provided.

41 Claims, 12 Drawing Sheets

(51) Int. Cl.

| | | |
|---|---|---|
| B32B 3/06 | (2006.01) | |
| B32B 5/02 | (2006.01) | |
| B32B 5/16 | (2006.01) | |
| B32B 15/09 | (2006.01) | |
| B32B 15/14 | (2006.01) | |
| B32B 27/14 | (2006.01) | |
| B32B 27/36 | (2006.01) | |
| H01B 1/22 | (2006.01) | |
| H01B 1/24 | (2006.01) | |

(52) U.S. Cl.
CPC .............. *B32B 7/025* (2019.01); *B32B 15/09* (2013.01); *B32B 15/14* (2013.01); *B32B 27/14* (2013.01); *B32B 27/36* (2013.01); *H01B 1/22* (2013.01); *H01B 1/24* (2013.01); *B32B 2264/108* (2013.01); *B32B 2307/202* (2013.01); *B32B 2307/206* (2013.01); *B32B 2571/00* (2013.01)

(58) Field of Classification Search
CPC ....... B32B 15/14; B32B 15/18; B32B 21/042; B32B 21/045; B32B 21/047; B32B 21/08; B32B 21/10; B32B 2250/02; B32B 2250/03; B32B 2255/02; B32B 2255/06; B32B 2255/08; B32B 2255/10; B32B 2255/26; B32B 2260/021; B32B 2260/046; B32B 2262/101; B32B 2262/106; B32B 2264/105; B32B 2264/108; B32B 2264/12; B32B 2307/202; B32B 2307/206; B32B 2307/546; B32B 2307/732; B32B 2307/748; B32B 2457/00; B32B 25/042; B32B 25/045; B32B 25/08; B32B 25/10; B32B 25/20; B32B 2571/00; B32B 27/065; B32B 27/08; B32B 27/12; B32B 27/14; B32B 27/283; B32B 27/30; B32B 27/32; B32B 27/36; B32B 3/06; B32B 3/08; B32B 3/30; B32B 5/02; B32B 5/024; B32B 5/028; B32B 5/16; B32B 5/18; B32B 5/245; B32B 5/26; B32B 7/025; B32B 7/06; B32B 7/08; B32B 7/12; H01B 1/20; H01B 1/22; H01B 1/24; H05F 3/02; H02G 1/04
See application file for complete search history.

(56) References Cited

U.S. PATENT DOCUMENTS

| | | |
|---|---|---|
| 4,462,712 A | 7/1984 | Penland, Sr. |
| 5,653,551 A | 8/1997 | Seaux |
| 6,205,722 B1 | 3/2001 | Bromley et al. |
| 6,467,234 B1 | 10/2002 | Marshall |
| 6,511,257 B1 | 1/2003 | Seaux et al. |
| 6,557,201 B1 | 5/2003 | Bowman |
| 6,722,831 B2 | 4/2004 | Rogers et al. |
| 7,370,452 B2 | 5/2008 | Rogers |
| 7,535,132 B2 | 5/2009 | Devine et al. |
| 7,536,973 B2 | 5/2009 | Mettler et al. |
| 8,902,559 B2 | 12/2014 | Xu |
| 9,039,325 B2 | 5/2015 | McDowell |
| 9,068,584 B2 | 6/2015 | Li |
| 9,132,996 B2 | 9/2015 | Robertson |
| 9,212,746 B2 | 12/2015 | McDowell |
| 9,297,124 B2 | 3/2016 | Robertson |
| 9,337,586 B2 | 5/2016 | McDowell et al. |
| 9,368,918 B2 | 6/2016 | McDowell et al. |
| 9,404,227 B2 | 8/2016 | Edwards, Jr. et al. |
| 9,430,943 B2 | 8/2016 | McDowell et al. |
| 9,598,863 B2 | 3/2017 | Hall et al. |
| 9,972,942 B1* | 5/2018 | Bordelon ................ E01C 5/005 |
| 9,985,390 B2* | 5/2018 | McDowell ........... H01R 13/648 |
| 2004/0154908 A1 | 8/2004 | Friedrich et al. |
| 2007/0025826 A1 | 2/2007 | Durfee |
| 2013/0112856 A1* | 5/2013 | Ferenc .................... H01J 43/06 250/216 |
| 2014/0090885 A1* | 4/2014 | Xu ......................... H01B 5/002 174/5 R |
| 2014/0196847 A1* | 7/2014 | Bergherm ................ C08K 3/04 252/511 |
| 2014/0259398 A1* | 9/2014 | Kendall ............. A47G 27/0237 5/420 |
| 2014/0322498 A1 | 10/2014 | May et al. |
| 2015/0099377 A1 | 4/2015 | McDowell et al. |
| 2015/0101831 A1 | 4/2015 | Dugas et al. |
| 2016/0017547 A1 | 1/2016 | Bordelon et al. |
| 2016/0134031 A1 | 5/2016 | Klein |
| 2016/0301161 A1 | 10/2016 | McDowell et al. |
| 2016/0312490 A1 | 10/2016 | McDowell et al. |

FOREIGN PATENT DOCUMENTS

| | | |
|---|---|---|
| EP | 1796235 A2 | 6/2007 |
| EP | 1727251 A3 | 2/2010 |
| WO | 2015053958 A1 | 4/2015 |
| WO | 2016091104 A1 | 6/2016 |

OTHER PUBLICATIONS

Kobayashi, Miki, PCT International Preliminary Report on Patentability of PCT/2018/043960, dated Jan. 28, 2020, 15 pages, International Bureau of WIPO, Geneva, Switzerland.

Gremmel, Hennig, ABB Switchgear Manual, ABB Pocket Book—Switchgear Manual, 1999, 903 pages, 10th Revised Edition,STAR Deutschland GmbH, Cornelsen Verlag, Berlin, Germany.

Zigma Ground Solutions Ltd, Applications from Transmission & Distribution, Oil & Gas, General Construction to Events, available at http://www.zigmagroundsolutions.com/applications, accessed on Jun. 7, 2016, 4 pages, Zigma Ground Solutions Ltd., Essex, United Kingdom.

Incident Prevention, Q&A, available at http://online.incident-prevention.com/article/Q+&+A/1685036/205113/article.html, Apr. 1, 2014, 2 pages, Incident Prevention, Crystal Lake, Illinois, United States.

Erga, Brian, Personal Protective Grounding: Underground Distribution Cables and Equipment, available at http://online.incident-prevention.com/article/Personal+Protective+Grounding/845292/82710/article.html, Oct. 1, 2011, 7 pages, Incident Prevention, Crystal Lake, Illinois, United States.

Electrical Transmission and Distribution Construction Contractors and Trade Association OSHA Partnership, Best Practices, Aug. 1, 2006, 50 pages, Electrical Transmission and Distribution Construction Contractors and Trade Association OSHA Partnership, United States.

Alexander Publications, Temporary Grounding for Lineworker Protection How to Safely Install and Remove Personal Protective Grounds, Aug. 1, 2013, pp. 92-93, 95, Alexander Publications, Newport Beach, California, United States.

Henkels & McCoy, Power Transmission, Aug. 21, 2014, 1 page, Henkels & McCoy, Blue Bell, Pennsylvania, United States.

powerlineman.com, Powerlineman.com Forums > Safety Meeting. Accidents and near misses > Equal Potential Grounding Practices, available at https://powerlineman.com/lforum/archive/index.php/t-2575.html, Jan. 5, 2007, 5 pages, Powerlineman.com Forums, United States.

(56) References Cited

OTHER PUBLICATIONS

Bonneville Power Administration, Level I Accident Investigation Report Wilson Construction Company Employee Fatality on the Bandon-Rogue No. 1 115kV Line Jul. 30, 2013, Sep. 24, 2013, 2 pages, Bonneville Power Administration, United States.

Erga, Brian, Personal Protective Grounding: Overhead Distribution and Transmission Systems, available at http://online.incident-prevention.com/article/Personal+Protective+Grounding/812923/79079/article.html, Aug. 15, 2011, 6 pages, Incident Prevention, Crystal Lake, Illinois, United States.

M.J. Electric, Transmission Line, Sep. 29, 2015, 10 pages, M.J. Electric, United States.

Dura-Base, Dura-base Advanced-Composite Mat System, at least as early as Apr. 21, 2016, 4 pages, Newpark Mats & Integrated Services, United States.

Colorado Electric Educational Institute & Colorado Rural Electric Association, Understanding Personal Protective Grounding in Substations Course Description, Dec. 10, 2013, 1 page, Colorado Electric Educational Institute & Colorado Rural Electric Association, United States.

Fischbach, Amy, Sterling Lumber Announces Launch of New EquiPotential Mat, available at http://tdworld.com/blog/sterling-lumber-announces-launch-new-equipotential-mat, Sep. 23, 2015, 2 pages, TDWorld.com, Overland Park, Kansas, United States.

Utility Products, Construction equipment: Grounding System composite mats increase efficiency, May 12, 2016, 3 pages, Utilityproducts.com, Tulsa, Oklahoma, United States.

Newpark, Newpark Expands Dura-Base® Matting Product Line with New EPZ Grounding System™ at 2015 ICUEE, Sep. 16, 2015, 2 pages, Newpark.com, United States.

Sherwood, Sklar A., Appellant's Opening Brief in *Potelco, Inc., Plaintiff/Appellant, v. Department of Labor and Industries,* Defendant/Respondent, 2015 WL 1264554 (Wash.App. Div. 1), Mar. 2, 2015, 6 pages, Westlaw Thomson Reuters, United States.

Ferguson, Robert W., Brief of Respondent in *Potelco, Inc.,* Appellant, v. *Department of Labor and Industries,* Respondent, Apr. 29, 2015, 40 pages, Court of Appeals, Division I of the State of Washington, United States.

Ferguson, Robert W., Department of Labor & Industries Answer To Petition for Review in *Potelco, Inc.,* Appellant, v. *Department of Labor and Industries,* Respondent, Nov. 23, 2015, 11 pages, Supreme Court of the State of Washington, United States.

Equipotential Matting, LLC, EPZ Mats—Equal Potential Grounding Mats for Bonded Work Zones, available at http://www.epzmats.com/WBA/Default.aspx, at least as early as Jun. 3, 2016, 2 pages, Equipotential Matting, LLC, United States.

Carey, Joseph P., Use of Rubber Gloves & Protectors for Underground Cable Splicing, Oct. 13, 2009, 17 pages, National Grid, United States.

Australian Utility, Equipotential Earth Mat, Jun. 12, 2014, 1 page, Australian Utility, Australia.

United States Department of Labor, Appendix C to §1910.269—Protection From Hazardous Differences in Electric Potential, available at https://www.osha.gov/pls/oshaweb/owadisp.show_document?p_id=9871&p_table=standards, at least as early as Sep. 24, 2014, 8 pages, United States Department of Labor, United States.

United States Department of Labor, 1910.269—Electric Power Generation, Transmission, and Distribution, available at https://www.osha.gov/laws-regs/regulations/standardnumber/1910/1910.269, at least as early as Oct. 5, 2015, 79 pages, United States Department of Labor, United States.

United States Department of Labor, Hazardous Energy Control Equipotential Zone, available at https://www.osha.gov/SLTC/etools/electric_power/hazardous_energy_control_equipotential.html, at least as early as Apr. 14, 2016, 1 page, United States Department of Labor, United States.

powerlineman.com, Powerlineman.com Forums > Linework Forum > Stringing Grounds, available at https://powerlineman.com/lforum/archive/index.php/t-8244.html, Jan. 5, 2007, 5 pages, Powerlineman.com Forums, United States.

powerlineman.com, Powerlineman.com Forums > Safety Meeting. Accidents and near misses > wire stringing safety procedures, available at https://powerlineman.com/lforum/showthread.php?2348-wire-stringing-safety-procedures, Feb. 5, 2007, 6 pages, Powerlineman.com Forums, United States.

powerlineman.com, Powerlineman.com Forums > Linework Forum > EPZ grounding, available at https://powerlineman.com/lforum/showthread.php?10127-EPZ-grounding, Apr. 11, 2013, 5 pages, Powerlineman.com Forums, United States.

powerlineman.com, Powerlineman.com Forums > Linework Forum > Best practices for grounding when reconductoring, available at https://powerlineman.com/lforum/archive/index.php/t-1671.html, May 28, 2006, 2 pages, Powerlineman.com Forums, United States.

powerlineman.com, Powerlineman.com Forums > Linework Forum > Grounds are Not for your protection!, available at https://powerlineman.com/lforum/archive/index.php/t-625.html, Jun. 17, 2005, 11 pages, Powerlineman.com Forums, United States.

White, John E., KCP&L Reconductors Energized 345-kV Line, Sep. 1, 2003, 6 pages, Transmission & Distribution World, A Primedia Publication, United States.

tdworld.com, Entergy changes its safety culture, available at http://tdworld.com/overhead-distribution/entergy-changes-its-safety-culture/, at least as early as Jun. 27, 2016, 1 page, T&D World, United States.

tdworld.com, Electric Utility Operations Patrick Flores, available at hhttps://www.tdworld.com/electric-utility-operations/article/20963937/patrick-flores, at least as early as Jun. 27, 2016, 2 pages, T&D World, United States.

Newpark Resources, Inc., Dura-base EPZ Grounding System An Innovative Solution for Equipotential Zones in Utility Applications, available at http://www.newpark.com/capabilities/mats-and-integrated-services/applications/utilities/dura-base-epz-grounding-system, at least as early as Apr. 21, 2016, 3 pages, Newpark Resources, Inc., United States.

IEEE Power & Energy Society, IEEE Guide for Temporary Protective Grounding Systems Used in Substations, Jan. 30, 2012, pp. 2 & 24, IEEE, United States.

IEEE, IEEE Guide to the Installation of Overhead Transmission Line Conductors, Mar. 12, 2004, pp. 8-9, 22-25, 28-29, 34-35, 52-53, 56-57, 84-85, & 90-91, IEEE, United States.

\* cited by examiner

ELECTRICALLY CONDUCTIVE SURFACE AND A PROCESS FOR PRODUCING THE SAME

CROSS REFERENCE TO RELATED APPLICATION

This application claims priority from United States Provisional Patent Application No. 62/537,867, filed on Jul. 27, 2017, entitled: "Electrically Conductive Surface And A Process For Producing The Same", entirety of which is incorporated herein by reference.

TECHNICAL FIELD

Embodiments described herein relate to an electrically conductive surface and a process for producing the same and, more particularly, to an electrically conductive surface for use as an equipotential zone mat in high voltage applications.

BACKGROUND

In the field of electric power, power lines carrying voltages ranging from 5,000 volts to more than 500,000 volts (5 kV to 500 kV) are serviced, repaired or maintained in both energized or de-energized states. To avoid downtime, work may be carried out when the power lines are energized. Work performed on power lines and/or associated equipment when the power lines and/or related apparatus are energized is usually referred to as live-line work. While performing live-line work, power line workers generally either work directly on, or in close proximity to, an energized conductor and/or related apparatus.

One example of live-line work is a conductor stringing or re-conductoring operation in which damaged or old conductors (wires) are replaced with new conductors. The stringing operation is carried out when the old conductors are in their overhead supported position in an energized state, for example supported on a pole or tower. Typically at least two pieces of stringing equipment, a conductor puller and a conductor tensioner, are employed in the re-conductoring operation. The new conductor is transferred from a conductor supply reel to its overhead supported position by means of the puller and tensioner. These devices are generally positioned on the ground at their respective ends of the re-conductoring operation. The new conductors are not energized or are in a de-energized state. However, because the new conductors are in close proximity to the old energized conductors, the new conductors may have a significant electrical potential, induced due to the electric fields generated around the old energized conductors. The new conductors may also be energized due to accidental contact with the old energized conductors or power line crossings during the stringing or re-conductoring operation. Power line workers, standing on the ground and working in close proximity to the new conductor, may accidentally contact the new conductor or stringing equipment used to install the new conductor.

Due to the difference in electrical potential between the power line worker standing on the ground and the new conductor having an induced potential, (in this example, the new conductor and/or stringing equipment used to install the new conductor), a high voltage may flow through the power line worker upon contacting the new conductor or stringing equipment. In order to protect power line worker from such electric shocks, an equipotential zone (EPZ) may be created around and on the ground in the work area and the power line workers and related stringing equipment are located within the equipotential zone. Within the EPZ, power line workers, new conductors and related stringing equipment are all kept at the same voltage potential. By eliminating the difference in electrical potential between the power line workers, new conductors and related stringing equipment, no current will flow through the bodies of the power line workers when the power line workers come into contact with the new conductors and/or related stringing equipment. An EPZ, therefore, creates a safe work environment for power line workers.

The prior art teaches various methods and apparatus for creating an EPZ. Applicant's pending European Patent Application Publication No. EP1727251 teaches creating an EPZ by overlaying one or more conductive mats or grids on the work area, referred to herein as EPZ mats. The EPZ mats are made of metal mesh where the mesh is solid. If multiple mats are used to create the equipotential zone, the mats are electrically bonded together. However, since such mats are directly laid on the ground and are made of a relatively stiff metal mesh, the mats may bend, buckle or break under heavy and/or repeated loading stresses, for example when heavy stringing equipment is positioned onto and off of the EPZ mats, thereby making it difficult to re-use the mats at another work site and potentially reducing the overall conductivity of the mats. Furthermore, the contamination of the EPZ mats, for example by dust, dirt, mud and other particles on the upper surface of the EPZ mats, may also significantly reduce the conductive properties of the EPZ mats and, therefore, compromise the integrity of the equipotential zone.

Additionally, it may be difficult to assemble such prior art EPZ mats as those taught in EP1727251 as the metal mesh or grid may be heavy and have sharp edges or protrusions, risking damage to a worker's hands during assembly.

The mats disclosed in EP1727251 are grounded using one or more ground rods. Power line workers and related stringing equipment are located on the EPZ and are electrically bonded to the new conductor or any equipment that could become energized using a bonding cable such as a conductive jumper. EP1727251 also discloses surrounding at least part of the EPZ with a first fence which in turn is also electrically bonded to the EPZ mats. In one embodiment, at least part of the EPZ may be surrounded by a second fence which is spaced apart from the first fence. Typically, these fences are constructed using steel fence posts. Often these posts cannot be driven into the ground surrounding the work area because of rocky terrain or buried utilities or ground grids. Further, metal fence posts are time consuming to install and remove and may become bent when removed from the ground thereby reducing their reusability. In order to protect power line workers from step potential, which occurs when a person steps off of the EPZ and onto the surrounding ground where the EPZ and the surrounding ground are at different electrical potentials, EP1727251 also discloses an insulated bridge or walkway associated with the EPZ.

U.S. Pat. Nos. 9,368,918 and 9,337,586 to McDowell et al. (collectively, the "McDowell patents") each disclose a load-supporting system comprising a plurality of planar mats associated with a plurality of removable, electrically-conductive covers. At least one cover is adapted to be coupled to each mat. The mat may be constructed of an impermeable plastic material. In some embodiments, the conductive cover includes an outer frame and an inner mesh portion. The frame and the mesh portion may be constructed at least partially of an electrically-conductive material. If the load-supporting system includes multiple mats, the mats are mechanically interconnected using suitable interconnection means. Further, the associated multiple conductive covers are also adapted to electrically connect to an adjacent conductive cover overlaid on an adjacent interconnected mat. The system also comprises grounding means. Assembly of such mats at a work site involves at least the following steps: interconnection of multiple mats; location of the multiple conductive covers on the multiple interconnected mats; coupling of the conductive covers to one or more of the underlying interconnected mats; and interconnection of the conductive mats to each other so as to establish a continuous electrical path therebetween. The load-supporting system taught in the McDowell patents thusly comprises a large number of components and is therefore expensive and complicated to assemble at a work site.

US Patent Application Publication No.: US 2016/0312490 to McDowell et al. relates to a system for supporting an upright member from a load bearing surface. The system comprises an elongated carrier that is releasably engageable with the holes in at least one mat of the load bearing surface. The system is used to support an upright item such as a sign, fence, barrier or other accessories on the load bearing surface.

SUMMARY

Embodiments described herein relate to electrically conductive apparatus/systems for location in the vicinity of energized power lines for protection of workers working on the energized power lines. Methods for creating electrically conductive apparatus/systems are also disclosed.

Accordingly, in a broad aspect, an apparatus for creating an equipotential zone on a work area in the vicinity of an energized power line is provided. The apparatus comprises a base member including an upper layer and a backing surface layer. An uppermost surface of the upper layer is adapted to support thereon at least power line workers and/or related stringing equipment. The backing surface layer is adapted to be in contact with a surface of the work area. Further, at least the uppermost surface of the upper layer comprises a substantially uniform layer of an electrically conductive flexible composition.

Accordingly, in another broad aspect, an equipotential zone system for location on a work area in the vicinity of an energized power line for supporting power line workers and/or related stringing equipment thereon is provided. The system comprises a plurality of base members adapted to be interconnected to each other by their connecting edges in an edge-to-edge arrangement for forming the equipotential zone. Each base member includes an upper layer and a backing surface layer. An uppermost surface of the upper layer is adapted to support thereon at least the power line workers and/or related stringing equipment and the backing surface layer is adapted to be in contact with the work area. The system further comprises at least one grounding element adapted to be coupled to the equipotential zone and at least one bonding cable adapted to be coupled to at least each of the base members, and/or related stringing equipment. Further, at least the uppermost surface of the upper layer comprises a substantially uniform layer of an electrically conductive flexible composition and electrical continuity between the interconnected base members is maintained at least through the electrically conductive flexible composition.

Accordingly, in another broad aspect, a method of creating an electrically conductive surface for location at a work area for supporting thereon power line workers and/or related stringing equipment is provided. The method comprises providing a base member including an upper layer and a backing surface layer. The method further comprises forming an uppermost surface of the upper layer by applying to the upper layer a substantially uniform layer of an electrically conductive flexible composition. The uppermost surface is adapted to support thereon at least the power line workers and/or related stringing equipment and the backing surface is adapted to be in contact with the work area.

Accordingly, in another broad aspect, a method of creating an electrically conductive surface for location at a work area for supporting thereon power line workers and/or related stringing equipment is provided. The method comprises providing a base member including an upper surface layer and a backing surface layer. Further, the method comprises forming an uppermost surface of the upper layer by operatively coupling an electrically conductive material or fabric to the upper layer of the base member.

Accordingly, in another broad aspect, a method of creating an equipotential zone at a work area for supporting thereon power line workers and/or related stringing equipment is provided. The method comprises forming a floor of the equipotential zone and adapting an uppermost surface of the floor to be electrically conductive. Further, the method comprises coupling at least one grounding element to the floor and coupling at least one bonding cable to the floor. Finally, the method comprises associating at least one electrically insulating bridge to an edge of the floor. The bridge extends from the edge of the floor onto an area outside of the floor.

Accordingly, in another broad aspect, a mat for creating a temporary, electrically conductive, load-bearing support surface forming an equal potential zone for supporting at least one object on a ground is provided. The at least one object includes persons or equipment and the mat comprises a body, an upper surface, a plurality of edges and an electrically conductive matrix extending through at least a portion of the body and forming at least a portion of the upper surface. The object is in electrical communication with the conductive matrix when the object engages the upper surface of the mat.

Accordingly, in another broad aspect, a method of forming an electrically insulating stairway for association with an equipotential zone is provided. The method comprises constructing a stairway including one or more foot treads from a rigid form rendering substrate. The method further comprises applying a flexible electrically insulating mold material over the form rendering substrate and causing the mold material to conform to the shape of the form rendering substrate to form a hollow shell in the substantial form of the stairway. The method finally comprises removing the form rendering substrate from the hollow shell.

BRIEF DESCRIPTION OF THE DRAWINGS

FIG. 7A shows the zone having an integrated barricade system, and FIG. 7B is a close-up view of the zone of FIG. 7A;

FIGS. 11A and 11B illustrate one embodiment of an insulated bridge associated with the equipotential zone of FIGS. 7A and 7B, wherein FIG. 11A is a side view of a module of the insulated bridge, and FIG. 11B is a partial side view of a module of the insulated bridge, the module of FIG. 11B being operatively coupled to a stairway;

FIGS. 13A to 13D are various views of another embodiment of an insulated bridge, wherein FIG. 13A is a side view of the insulated bridge, and wherein the bridge includes a deck section and stairways associated with the deck section, FIG. 13B is a side view of the insulated bridge absent handrails of the deck section and the stairways, FIG. 13C is a top view of the bridge of FIG. 13B, and FIG. 13D are top views of the deck section and a foot tread associated with the bridge of FIG. 13A.

DETAILED DESCRIPTION

The electrically conductive surface described herein has been primarily defined in the context of an equipotential zone or EPZ. As defined in the background an equipotential zone is a work area in which a power line worker or other worker is protected from electric shock from differences in electric potential between objects located within the work area. These differences in potential may be caused for example by induced voltage, line re-energization, or lightning. However, as one skilled in the art will appreciate, the electrically conductive surface defined herein may be used in any application which requires formation of a uniform, highly conductive, load-bearing surface.

Figure 1:
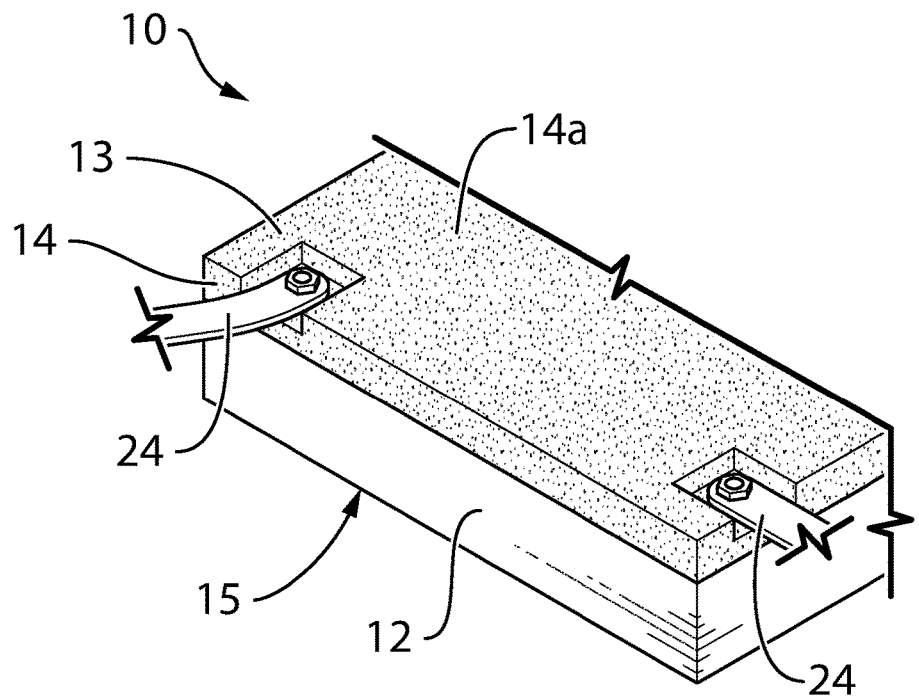
FIGS. 1 and 1A are partial perspective front views of an electrically conductive surface according to embodiments of the present disclosure, the electrically conductive surface including one or more connectors located along its connecting edges.
Figure 1A:
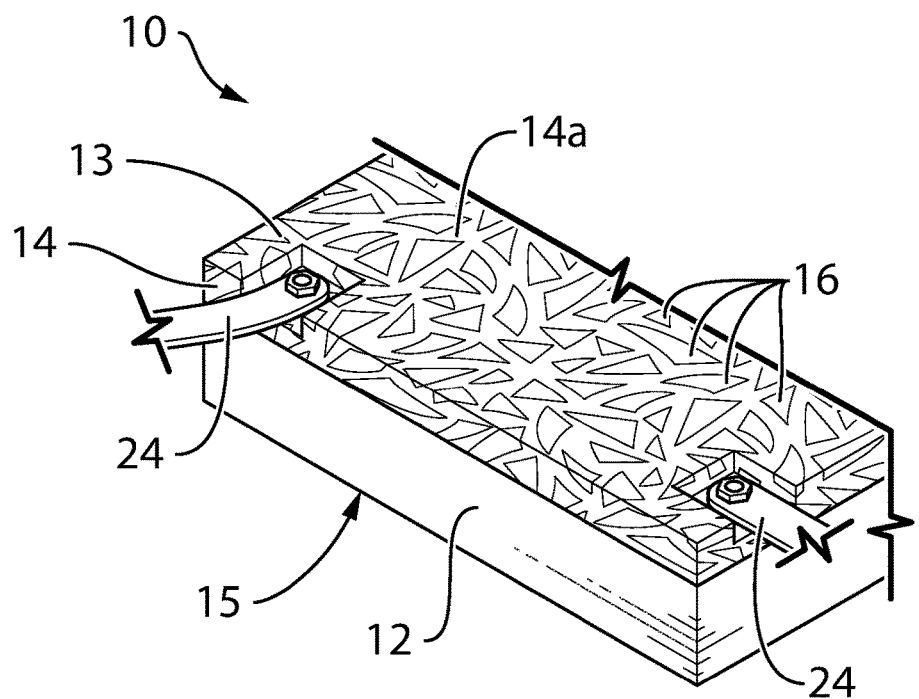
Figure 2:
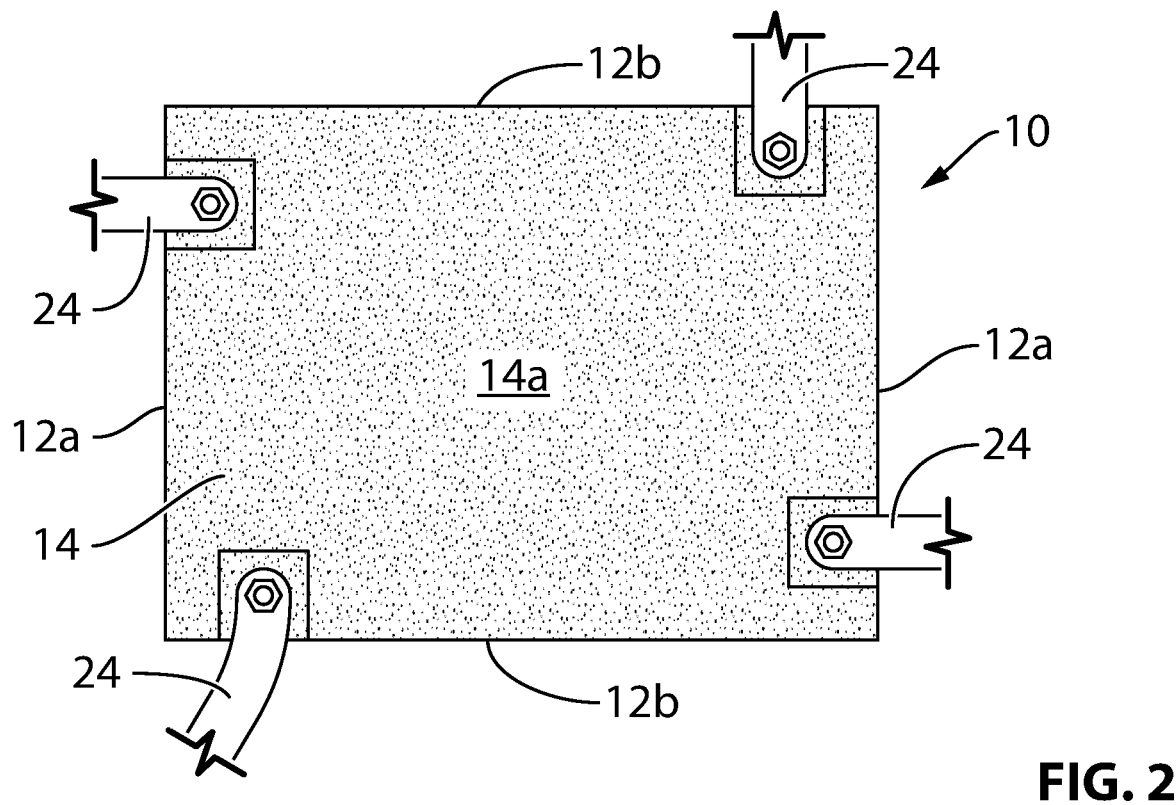
FIG. 2 is a plan view of the electrically conductive surface of FIG. 1.
Figure 7A:
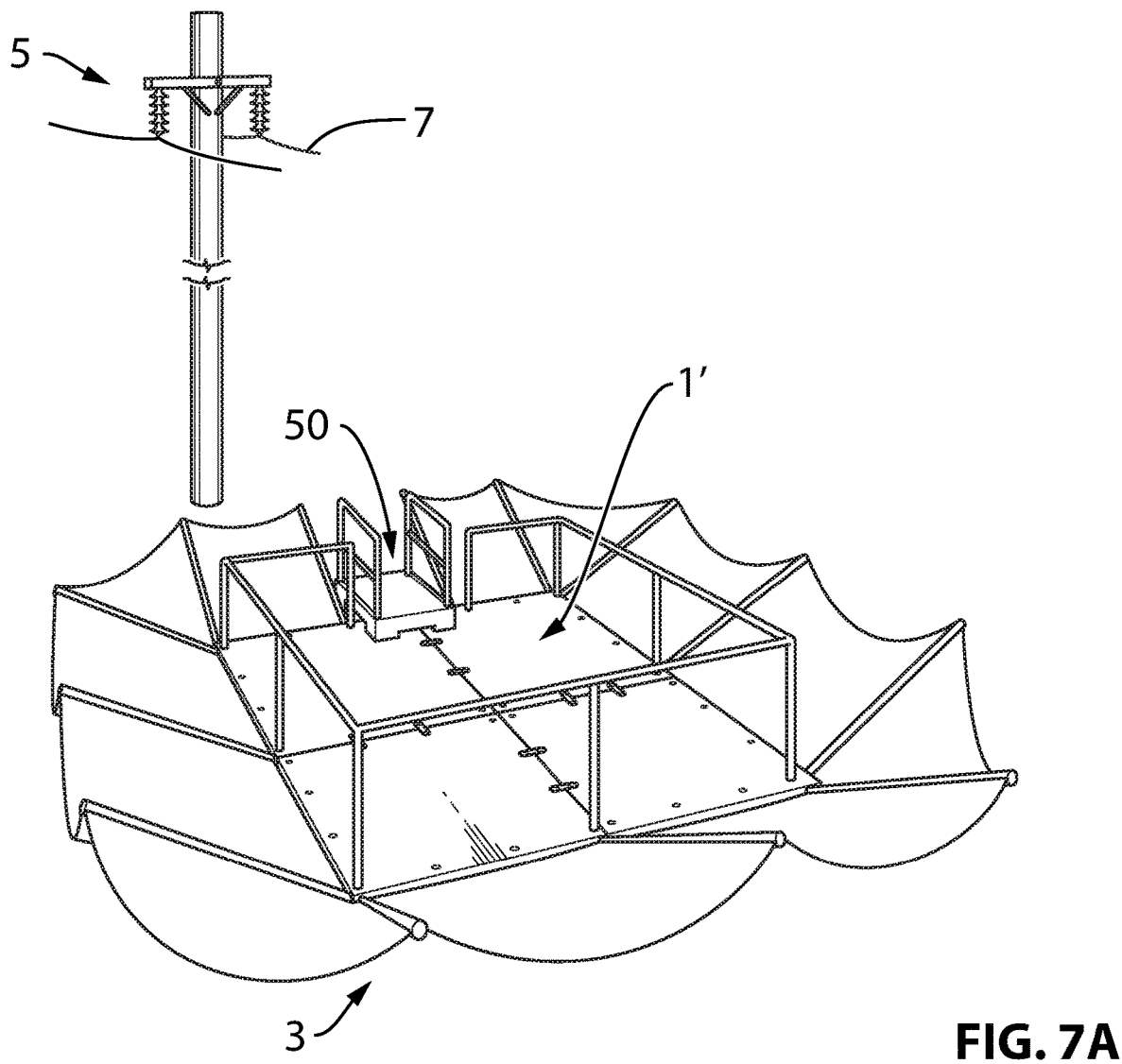
FIGS. 7A and 7B are schematic views of the equipotential zone of FIG. 4 deployed on a work area in the vicinity of an energized power line.

FIGS. 1 through 9 illustrate an apparatus 10 for creating an equipotential zone 1 on a work area 3 in the vicinity of an energized power line 5 (best seen in FIG. 7A). The energized power line 5 includes power transmission lines/conductors 7 carrying voltages for example in the range of 5 kV to more than 500 kV. In one embodiment and as seen in FIG. 1, the apparatus 10 includes a base member 12 having an upper layer 14 and a backing surface layer or ground surface 15, which ground surface 15 is adjacent the ground of the work area 3 when the apparatus 10 is positioned on the work area 3. The base member 12 acts as a load-supporting member and is deployed on the work area 3 for forming the equipotential zone 1. The base member 12 of apparatus 10 has sufficient mechanical strength to withstand the weight of workers and/or equipment that may be needed within the EPZ. The base member 12 may be formed of a rigid or flexible material such as wood, aluminum, rubber, plastic, fiberglass, fiber reinforced plastic, high density polyethylene or any combination thereof. In one embodiment and as seen in FIGS. 1 and 1A, the base member 12 may have a rectangular shape, for example, having dimensions of substantially four feet wide by eight feet long, so that the base member 12 may be transported and positioned adjacent other base members 12 with relative ease. The base member 12 has a pair of opposing short side edges 12a and long side edges 12b. The upper layer 14 overlays the base member 12 and is adapted such that workers or equipment may be positioned on upper layer 14. Accordingly, the uppermost surface 14a of the upper layer 14 is substantially flat or planar.

In one embodiment, in order to render the upper layer 14 conductive, the upper layer 14 includes an electrically conductive composition, the composition comprising a non-conductive support material 13 and conductive particles 16. In some embodiments and with reference to FIG. 1, the conductive particles 16 may include fine particles; other embodiments (for example, FIG. 1A) include conductive particles having dimensions that are two inches or larger. The particles may be in the form of flat flakes of any geometrical shape or may be three-dimensional shapes of any geometry. The size and packing density of the conductive particles 16 embedded within the upper layer 14 is such that a continuous electrically conductive path is formed substantially throughout the entirety of the upper layer 14, including extension of the continuous electrically conductive path to the surface 14a of upper layer 14, whereby personnel, tools, and stringing equipment that are positioned on the uppermost surface 14a of apparatus 10 may be electrically connected to the electrically conductive path extending through upper layer 14.

In one embodiment the composition of upper layer 14 may comprise a ratio of at least substantially 2.5 parts conductive particles 16, such as for example graphite particles, to one part polyester resin (by volume). The applicant observes that this ratio of composition provides sufficient density of conductive particles 16 so as to create a uniform conductive surface 14a supported by a typically non-conductive support material 13. In this example, the composition in its liquid form may be applied over base member 12. While a greater ratio of conductive material to resin will increase conductivity of the upper layer 14, it may also make the resin, in its liquid form, more difficult to deal with as the mixture becomes more viscous. In the example provided above, the composition in its liquid form is very viscous, like a putty. Testing has shown that the mix ratio in the example above creates a resistivity of approximately +/−80Ω across the upper layer 14. As mentioned previously, the member 12 may include a commercial mat manufactured of suitable materials for supporting a load, including for example plastic, such as high density polyethylene, fiber-reinforced plastic, or other plastics that are sufficiently strong enough to support the target load and which are preferably lightweight for ease of transportation and manipulation; as well as other materials such as wood, laminate, aluminum, rubber or any other suitable materials known to a person skilled in the art. Although the applicant provides the example of graphite particles as the conductive particles 16 utilized in the composition referred to above, the conductive particles may include any suitable conductive particles, including and not limited to: graphite or metal shavings, filings or chips; the metal particles may be aluminum, steel, iron or any other suitable metal or any combination of such conductive particles, and also includes any other conductive particles known to a person skilled in the art.

Furthermore, although the applicant provides the polyester resin above as an example of the non-conductive support material 13 component of the upper layer 14, it will be appreciated by a person skilled in the art that other materials may be utilized for the non-conductive support material 13, including and not limited to: thermoplastic; plastic and fiberglass composite; fiberglass; rubber; silicone polymer; fiberglass gel coat. It will also be appreciated that various methods may be utilized to form the upper layer 14 and are not limited to the example provided above of coating the base member 12 with a liquid composition including the conductive particles 16 and the non-conductive support material 13. Other embodiments described herein teach alternative methods contemplated by the Applicant for forming the upper layer 14.

Figure 3A:
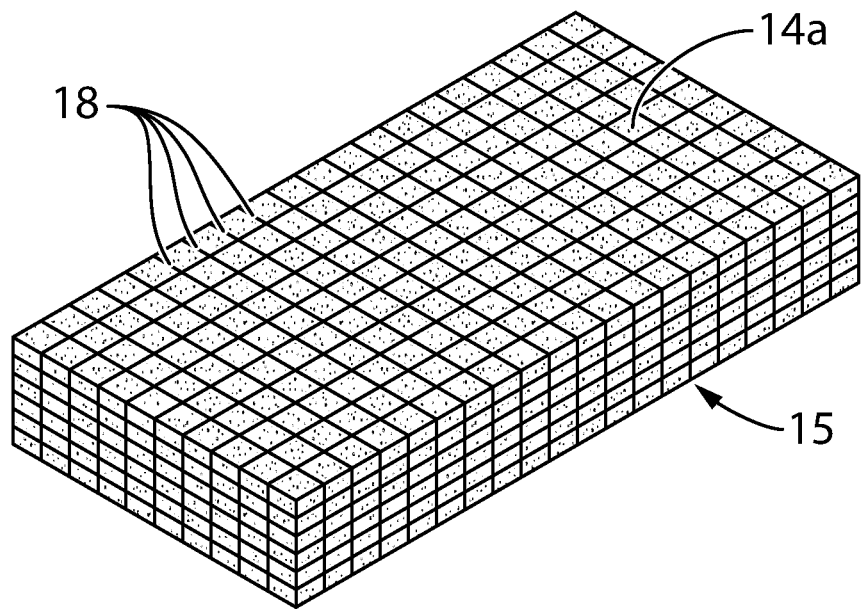
FIG. 3A is a perspective front view of an electrically conductive surface according to another embodiment of the present disclosure.

In an alternative embodiment as shown in FIG. 3A, the upper layer 14 comprises one or more conductive elements 18 partially embedded therein and which extend toward and are partially exposed on the uppermost surface 14a of upper layer 14. The one or more distributed conductive elements 18 may be partially embedded in upper layer 14 in a grid-like pattern so as to create a conductive matrix extending across substantially across its entire surface. The conductive elements form at least a portion of the uppermost surface 14a of the upper layer 14. As seen in FIG. 3A, the grid-like pattern may also extend along the sides of the upper layer 14. For example, not intending to be limiting, the conductive elements 18 may have a thickness in the range of 0.125 inches to 0.375 inches. The conductive elements may also include one or more sheets, rather than a plurality of wires arranged in a grid. The one or more distributed conductive elements 18 may be constructed from a suitable electrically conductive material such as aluminium, stainless steel, any other metal, or a combination thereof. In another embodiment, the conductive sheet or grid 18 may include a woven carbon fiber sheet that may be embedded into the uppermost surface 18. The carbon fiber sheet may have a thickness in the range of 0.001 inches to 0.125 inches.

Figure 3B:
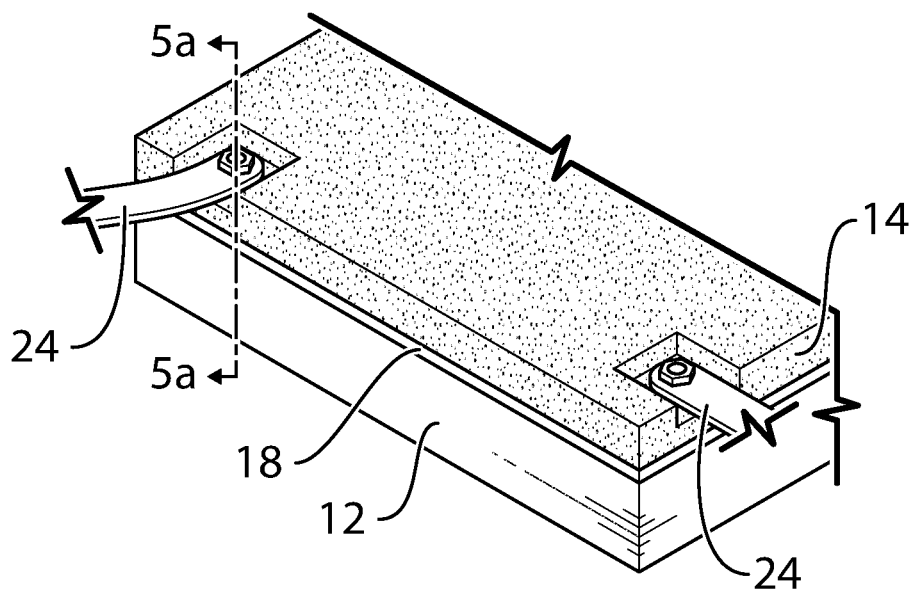
FIG. 3B is a partial perspective front view of an electrically conductive surface according to another embodiment of the present disclosure.

In another embodiment, as shown in FIG. 3B, the one or more conductive elements 18 may constitute a layer sandwiched between the base member 12 and the upper layer 14, wherein the upper layer 14 is a composition of conductive particles 16 embedded into and distributed throughout a non-conductive support material 13, as described above in relation to other embodiments. In these embodiments, the conductive elements 18 provide an additional layer of conductivity which enhances the overall electrical conductivity of the upper layer 14 and consequently electrical conductivity of its uppermost surface 14a. Advantageously, the layer of conductive elements 18 may also enhance the electrical connection of a plurality of connected apparatus 10 so as to provide a substantially uniformly conductive surface across the plurality of connected apparatus 10, as further described below.

Figure 14:
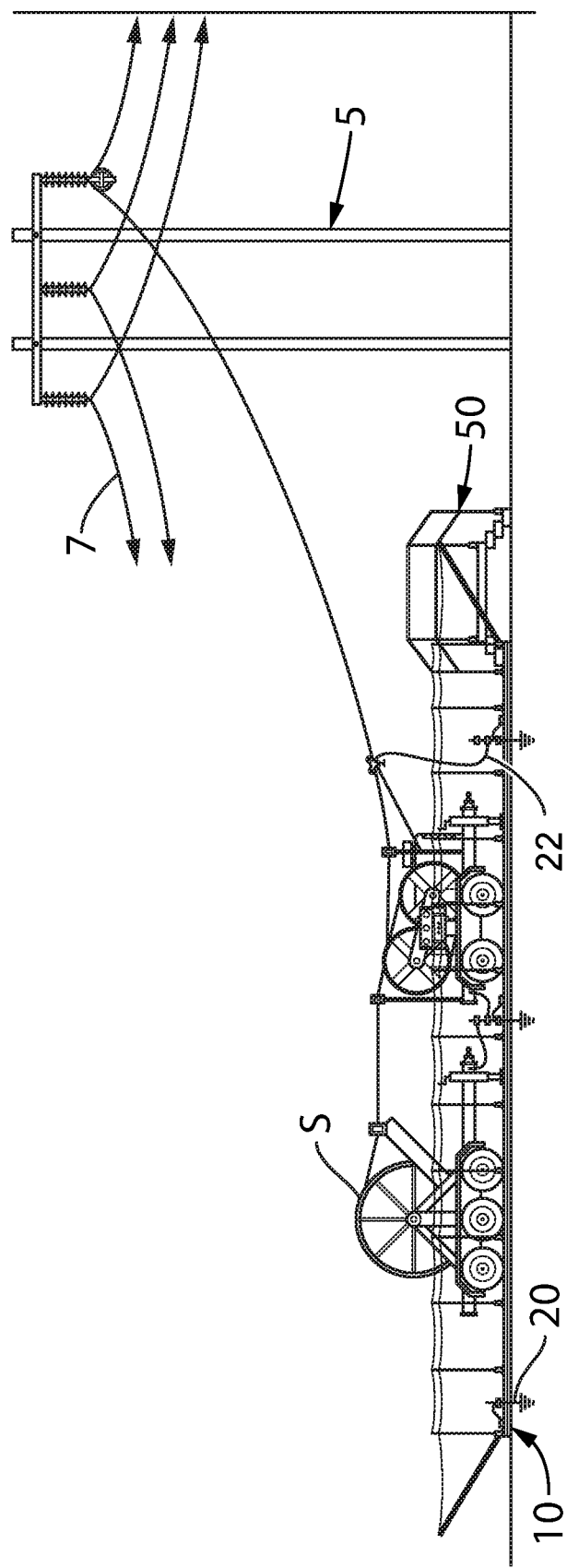
FIG. 14 is a schematic side view of an equipotential zone in the vicinity of an energized power line, the view illustrating stringing equipment positioned on the equipotential zone and an insulated bridge operatively coupled to the equipotential zone.

The base apparatus 10 further includes or cooperates with at least one grounding element such as a ground rod 20 and includes at least one bonding cable 22 (best seen in FIG. 14) for connecting the apparatus 10, new conductor and stringing equipment S located on the base member 12 together.

Figure 4:
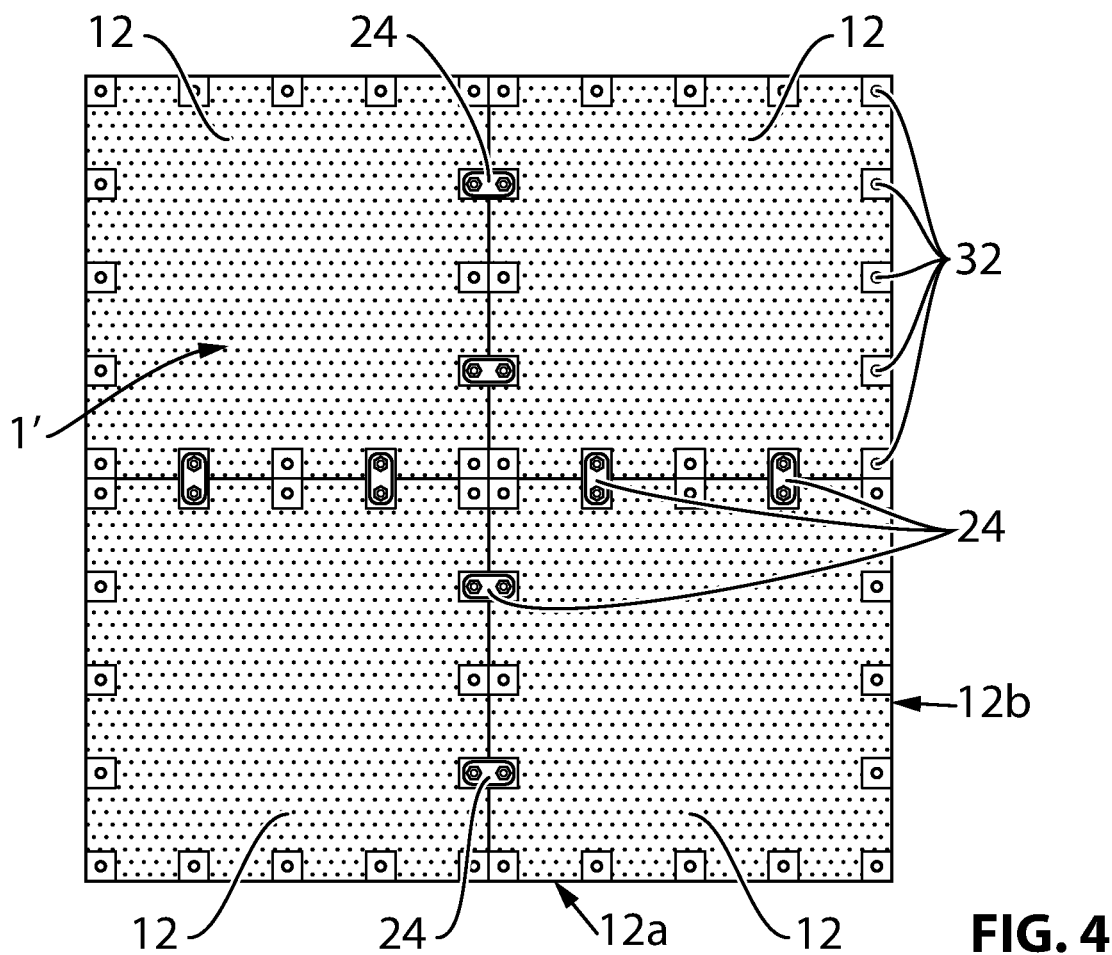
FIG. 4 is a plan view of an equipotential zone formed by interconnecting multiple electrically conductive surfaces of FIG. 1.
Figure 5A:
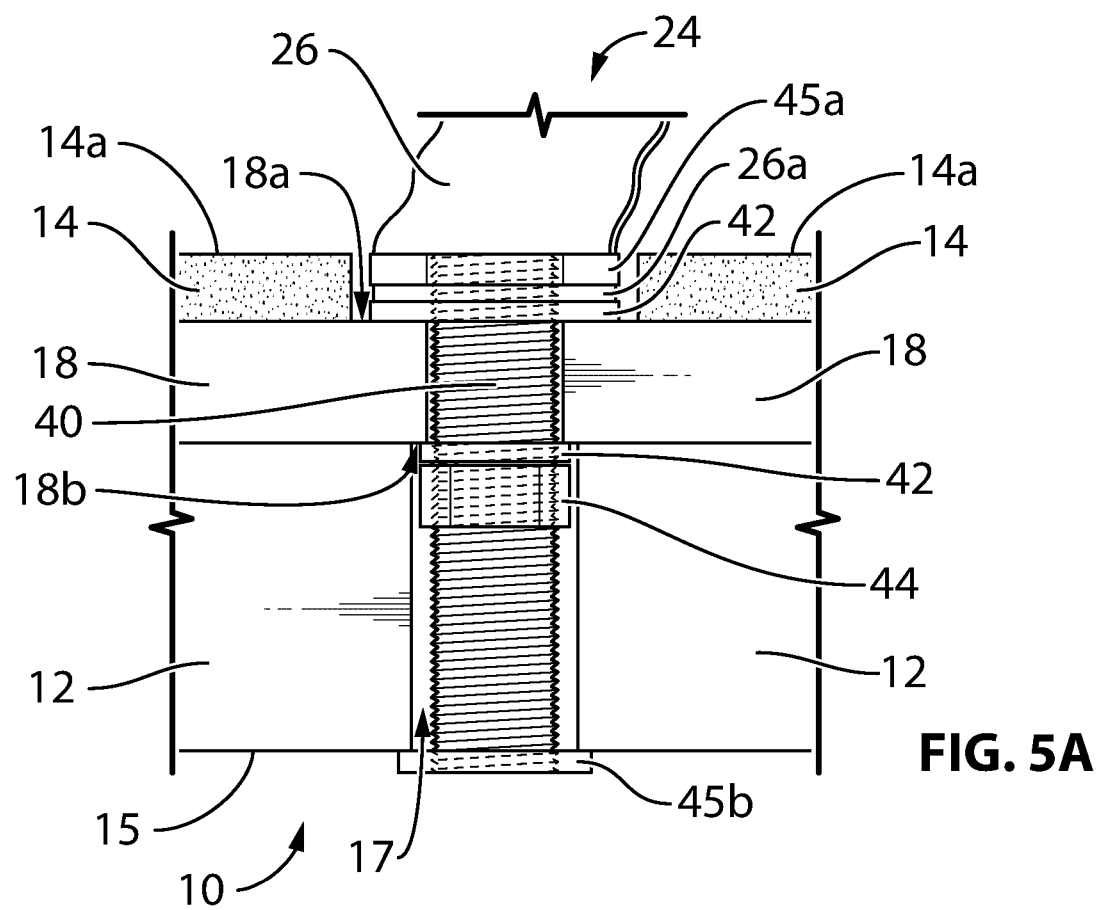
FIG. 5A is partial end on view of FIG. 4, the figure illustrating details of one embodiment of a connector.

In one embodiment, a larger equipotential zone 1' may be created by interconnecting a plurality of apparatus 10, as depicted for example in FIGS. 4, 7A, 7B and 14. As shown in the example of FIG. 4, an equipotential zone 1' may be created using four apparatus 10 which are mechanically and electrically interconnected by a plurality of connector assemblies 24 along the short and long edges 12a, 12b of each apparatus 10, respectively. The connector assemblies 24 are made of an electrically conductive material in order to maintain a continuous conductive path between the interconnected apparatuses 10. With reference to FIG. 5A, in one embodiment, the connector assemblies 24 include a nut and bolt arrangements and a connecting strap 26, wherein for example, each apparatus 10 includes one or more bores 17 extending from the uppermost surface 14a to the ground surface 15 of apparatus 10. To mount the connector strap 26 to an apparatus 10, a bolt 40 is journaled through the bore 17, the bolt 17 having for example two washers 42, 42, wherein each washer 42 is positioned adjacent to either surface 18a or 18b of the conductive element layer 18. Nut 44 may be utilized to snugly urge the washer 42 against the surface 18b of conductive element 18, on the one side. On the other side, end piece 45a of bolt 40 may include another nut, whereby nut 45a may be used to sandwich a strap flange 26a of strap 26 between a washer 42 and the nut 45a, and nut 45a may also urge strap flange 26a and washer 42 against surface 18a of conductive element layer 18. The other end piece 45b of bolt 40 may be a bolt head or may be another nut. The opposing end of strap 26 (not illustrated) similarly has a flange 26a which is bolted to an adjacent apparatus 10 utilizing the same or similar bolt 40, washers 42, 42 and the nuts 45a, 44. Advantageously, bolt 40, the washers 42, 42 and the nuts 45a, 44 may all be made of metal or other electrically conductive materials, and the arrangement of the connector assembly 24 as described above and illustrated in FIG. 5A may advantageously enhance the electrical connection between adjacent interconnected apparatuses 10, 10, as shown for example in FIG. 4. In order to further enhance the electrical continuity between adjacent interconnected multiple apparatus 10, each apparatus may have a substantially uniform layer of the electrically conductive composition, described above, exposed and extending along its sides (best seen in FIG. 6), so that when the sides of adjacent base members abut, electrical conductivity extends continuously across all abutting base members.

Figure 5B:
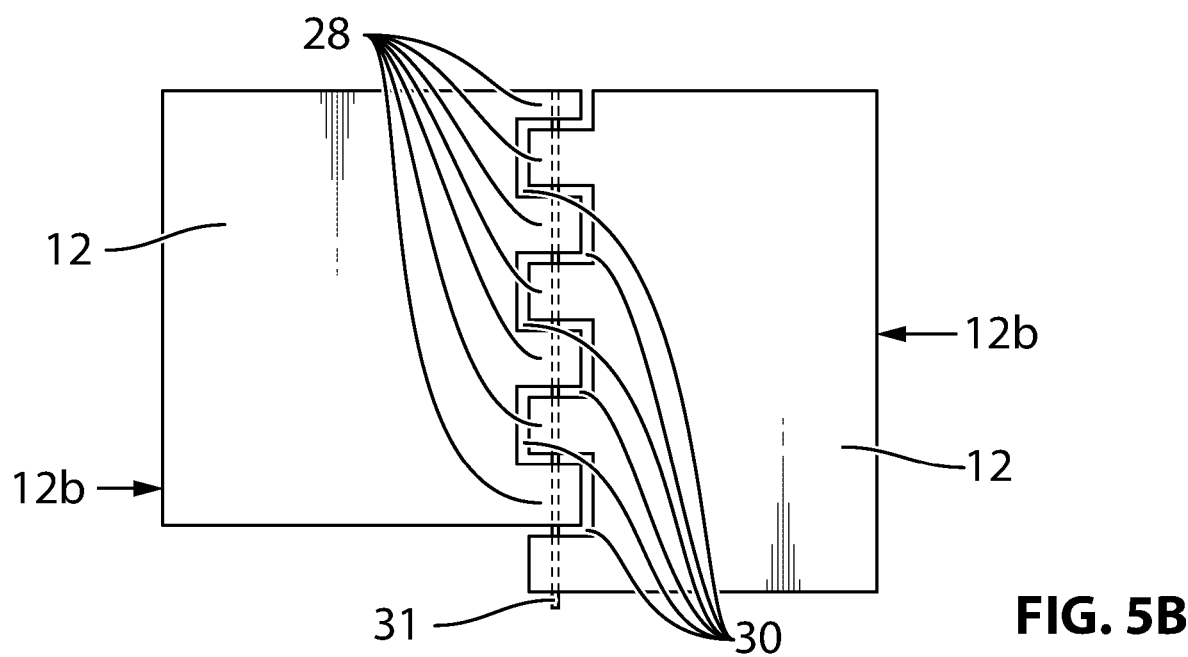
FIG. 5B is a top schematic view of an alternate embodiment of a connector system for interconnecting two adjacent electrically conductive surfaces.
Figure 6:
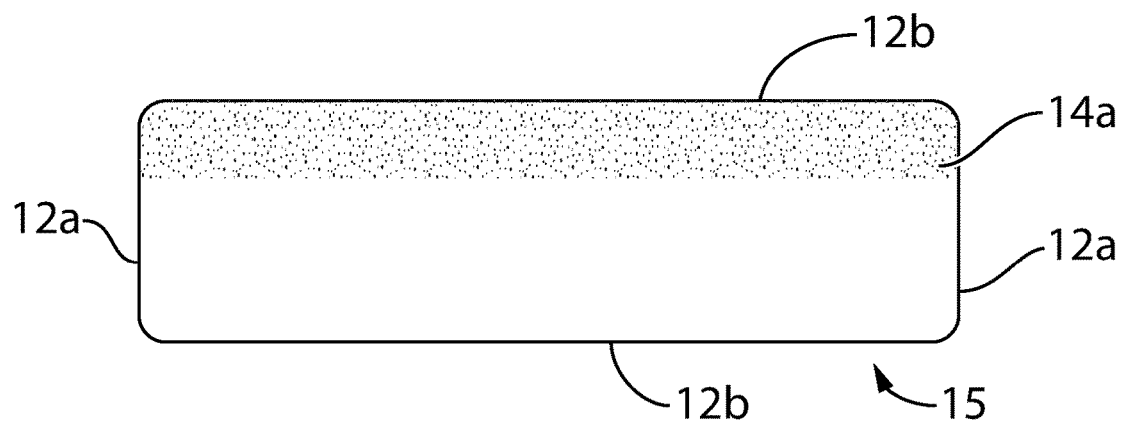
FIG. 6 is an end view of one of the electrically conductive surfaces of FIG. 4.

FIG. 5B illustrates another embodiment of a connector system for interconnecting two adjacent apparatus 10. In this embodiment, each apparatus 10 is provided with alternating or interlocking offset extensions 28 and recesses 30 forming a finger-joint along the connecting edges 12a or 12b. Two adjacent base members 12 are interlocked by aligning the extensions 28 and recesses 30 and press fitting the extensions 28 into the complementary recesses 30. The extensions 28 are retained in the recesses 30 by one or more pins or rods 31. As the one or more pins or rods 31 are made of a metal or other conductive material, the one or more pins 31 also contribute to the enhancement of electrical continuity between the two interconnected apparatuses 10. Although a finger-joint is illustrated, it would be understood by one skilled in the art that other forms of joints would also work: for example, dovetail joints, bridle joints, mortise-and-tenon joints, tongue and groove joints, dowel joints, to name a few.

Further, one of skill in the art will appreciate multiple apparatus 10 may be interconnected in any other suitable manner. For example, the apparatus 10 may be interconnected using connectors 24 manufactured of steel or any other conductive material and made in the form of plates, straps, hinges, braided wire, or any other suitable form of connector assemblies 24.

Figure 8:
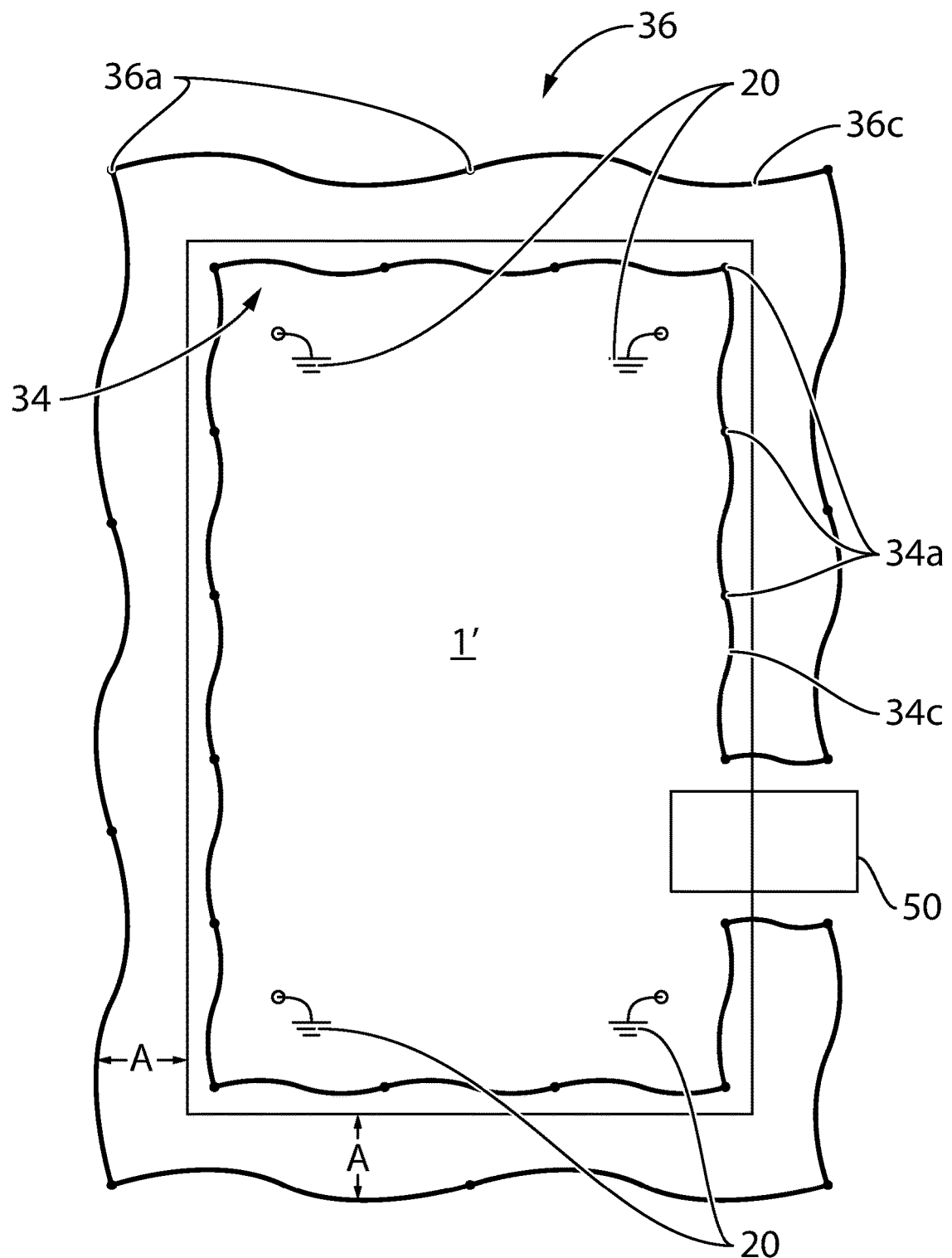
FIG. 8 is a plan view of the equipotential zone of FIG. 7A.
Figure 9:
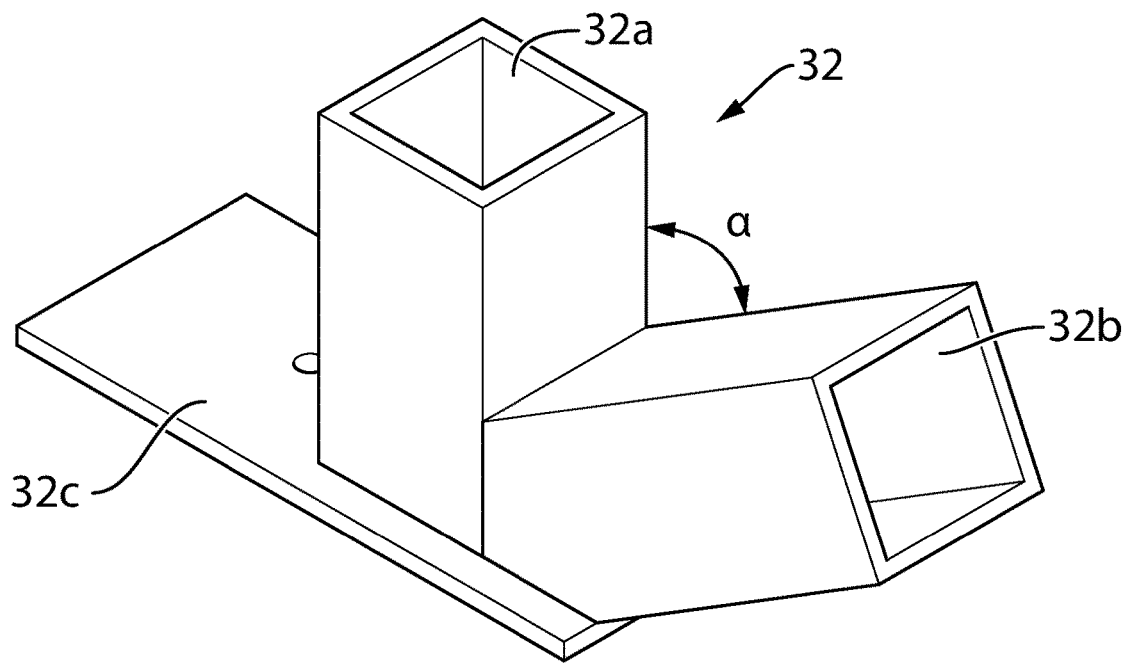
FIG. 9 is a side perspective view of an embodiment of a locator, in accordance with the present disclosure.
Figure 10:
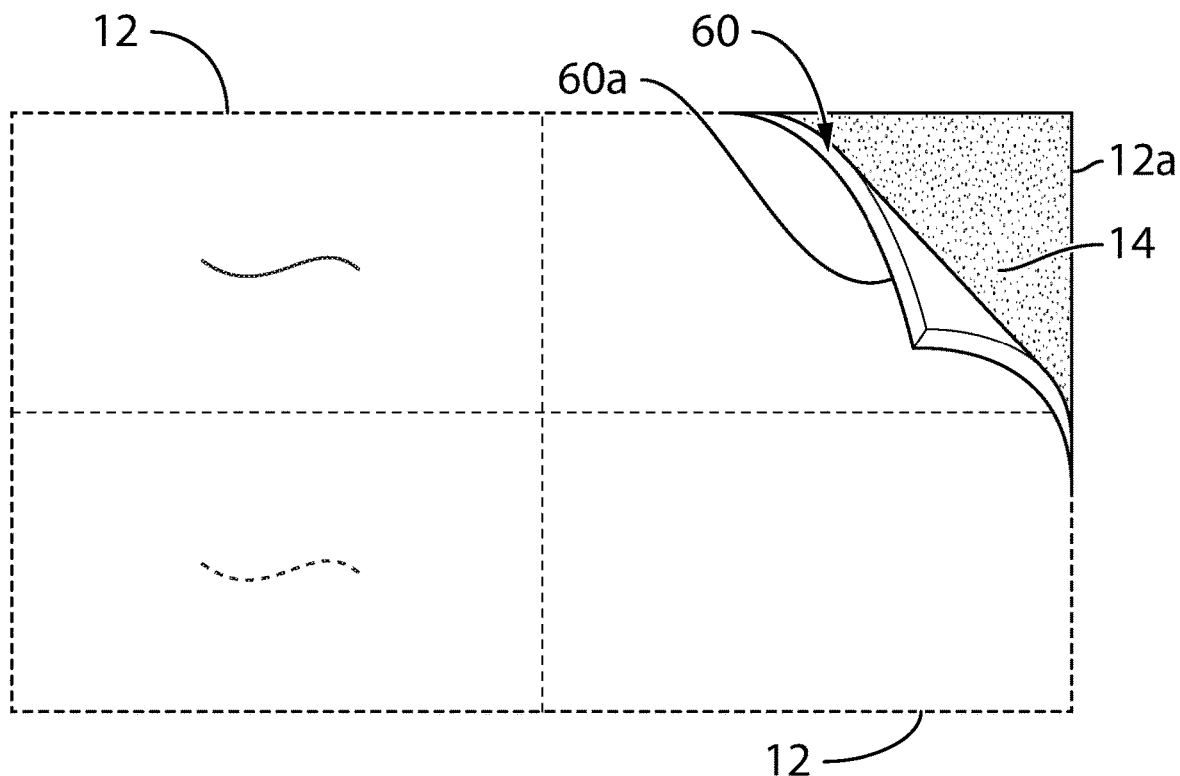
FIG. 10 is a top view of an electrically conductive surface according to another embodiment.

FIG. 10 illustrates another embodiment of the apparatus illustrated in FIGS. 1 to 9. In the embodiment of FIG. 10, the upper layer 14 includes an electrically conductive material or fabric 60 that may be operatively coupled to the support or base member 12. In one embodiment, the fabric 60 may be glued or adhered to the underlying base member 12 using an adhesive. Alternatively or additionally, mechanical fasteners may be used to attach the fabric 60 to the underlying base member (as a substitute for or in addition to an adhesive). In FIG. 10, dashed lines have been used to depict the underlying base member 12, which has over the top of it, the fabric 60 that is conductive. In FIG. 10, a side 60*a* of fabric 60 is "pulled up" or "pulled back" from a corresponding side 12*a* of the base member 12 to better illustrate the underlying base member 12. The fabric may be replaceable or otherwise removable from the underlying base member 12. As an example and without intending to be limiting, the fabric 60 may be canvas that is sprayed or coated with an electrically conductive composition, such as that described in the foregoing paragraphs, in order to render the fabric 60 electrically conductive or be made with conductive wires interwoven in to the material.

Figure 7B:
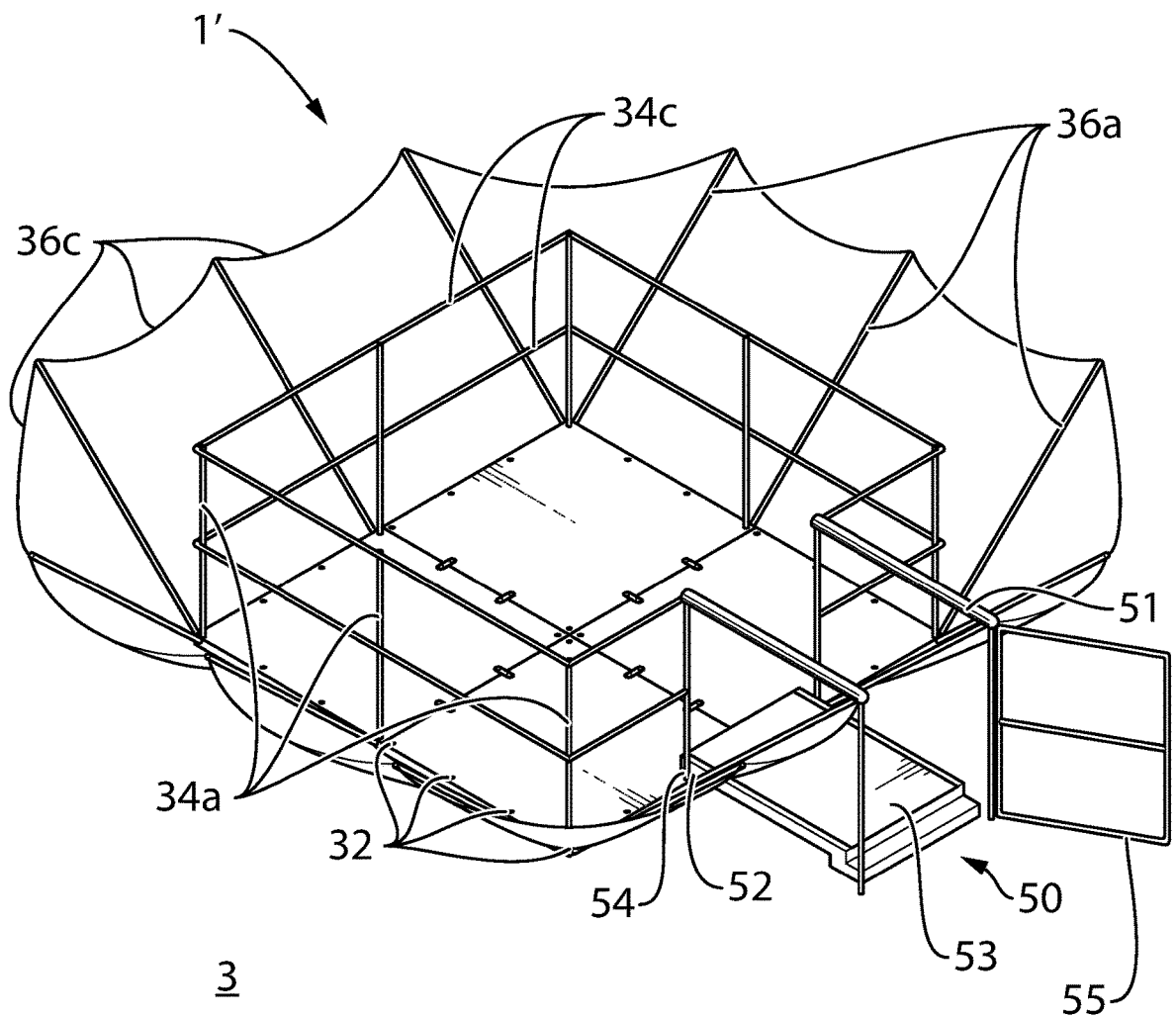

As shown in FIGS. 7A, 7B and 8, in some embodiments the equipotential zone 1' includes a removable barricade system such as a fence 34 supported on and extending from the upper surface 14*a* around at least a part of the periphery of zone 1'. Accordingly, as seen in FIGS. 7A and 7B, uppermost surface 14*a* is provided with one or more locators 32 for releasably receiving therein a longitudinal or upstanding, substantially orthogonal member or post 34*a* of the fence 34, wherein post 34*a* is substantially orthogonal to the uppermost surface 14*a*. In one embodiment, the locator 32 may also be adapted to receive therein an angled, longitudinal member or post 36*a* of a second fence 36.

The barricading system is erected by locating the longitudinal members 34*a* and 36*a* of the fences 34 and 36, respectively within the perimeter of interconnected plurality of apparatus 10. The longitudinal members are located within a friction fit device such as locator 32 that connects and disconnects easily to and from the uppermost surface 14. In one embodiment and as shown in FIGS. 7A, 7B and 9, the locators 32 may be brackets with holes or sockets 32*a*, 32*b* that provide a friction fit for the posts 34*a*, 36*a* of the fences 34, 36. This enables the posts 34*a*, 36*a* to extend from and be supported by the apparatus 10, rather than having to support the posts 34*a*, 36*a* from the ground of the surrounding work area 3. This eliminates the time and issues associated with pounding steel fence posts directly into the ground. The locators 32 may be screwed directly into the apparatus 10 or bolted on using integrated threaded inserts in the upper layer 14. Alternatively, the upper layer 14, either alone or in combination with the base member 12, may include molded or otherwise formed depressions in place of the metal brackets for barricade installation, as shown for example in FIG. 4.

As stated above, the locator 32, in one embodiment, may comprise two mounting slots or sockets 32*a* and 32*b* for receiving the longitudinal members of the barricade system. In the embodiment illustrated in FIG. 9, sockets 32*a* and 32*b* have a square cross-section so as to define a square opening. However, this is not intended to be limiting. As one skilled in the art will appreciate, the sockets may be of other cross-sections including round and may have other shaped openings formed therein. Socket 32*a* extends perpendicularly from a flange 32*c* of the locator 32. Posts 34*a* may be mounted substantially orthogonally to the upper surface 14*a* of apparatus 10 within these sockets 32*a*. Optionally, the second socket 32*b* may extend from the flange 32*c* at an angle α relative to socket 32*a*, for example at approximately 45 degrees, such that posts 36*a* mounted in sockets 32*b* extend outwardly at angle α to form an exterior barrier or fence 36 which is spaced apart from the interior barrier or fence 34. One or more horizontal members 34*c* and 36*c*, such as ropes, boards or any other suitable member for forming a barrier, may be strung between the posts 34*a* and 36*a*, respectively, so as to form the fences 34 and 36. Preferably, the socket 32*b* may be tilted at angle α and the length of the posts 36*a* may be sized so as to create an exterior barrier 36 that is at substantially the same height as interior barrier 34, located at a horizontal distance A from the outer perimeter of equal potential zone 1', as shown for example in FIG. 8. Without intending to be limiting, the distance A may for example be in the range of six to twelve feet, or any other suitable distance so as to prevent or deter contact between persons on or equipment bonded to the equal potential zone 1' and any persons or equipment located outside the exterior barrier 36, thereby preventing the electric shock that may otherwise occur due to a difference in potential between persons on or equipment bonded to the equal potential zone 1', and persons or equipment located off of the equal potential zone 1'. The fence posts 34*a* may be and 36*a* must be non-conductive plastic poles which may be made from any rigid non-conductive material such as polyvinyl chloride (PVC), fiber reinforced plastic, or fiberglass.

In another aspect of the present disclosure, and with reference to FIGS. 7A and 7B, the equipotential zone 1' is further provided with an insulated bridge 50, for the purpose of providing an insulated transition between the work area 3 and the equipotential zone 1', so as to avoid step potential that may occur when a person places one foot on the zone 1' while leaving the other foot on the ground of work area 3. When that occurs, if the electrical potential of the work area—3 is different from the electrical potential of the equipotential zone 1' the person may experience an electric shock. Therefore, the bridge 50 is electrically insulated from both the work area 3 and the equipotential zone 1' such that a person moving on and off of the equipotential zone 1' cannot do so while having one foot in the zone 1' and the other foot on the ground 3. In one embodiment, the insulated bridge 50 may be connected at one end to one or more apparatus 10 using friction fit 52 or other quick connecting devices. In one embodiment, the insulated bridge 50 may include non-conductive handrails 51, a non-slip surface 53, gates 55, and suitable insulators for electrically isolating the insulated bridge from an underlying surface such as ground. The bridge 50 and associated accessories may be made of fiber-reinforced plastic or any other similar material.

In FIGS. 11 to 13D, wherein, again, like references depict like elements in each view, various embodiments of the insulated bridge 50 as contemplated by the Applicant are depicted. As before, the insulated bridge 50 insulates a person exiting or entering the equipotential zone 1'.

Figure 11A:
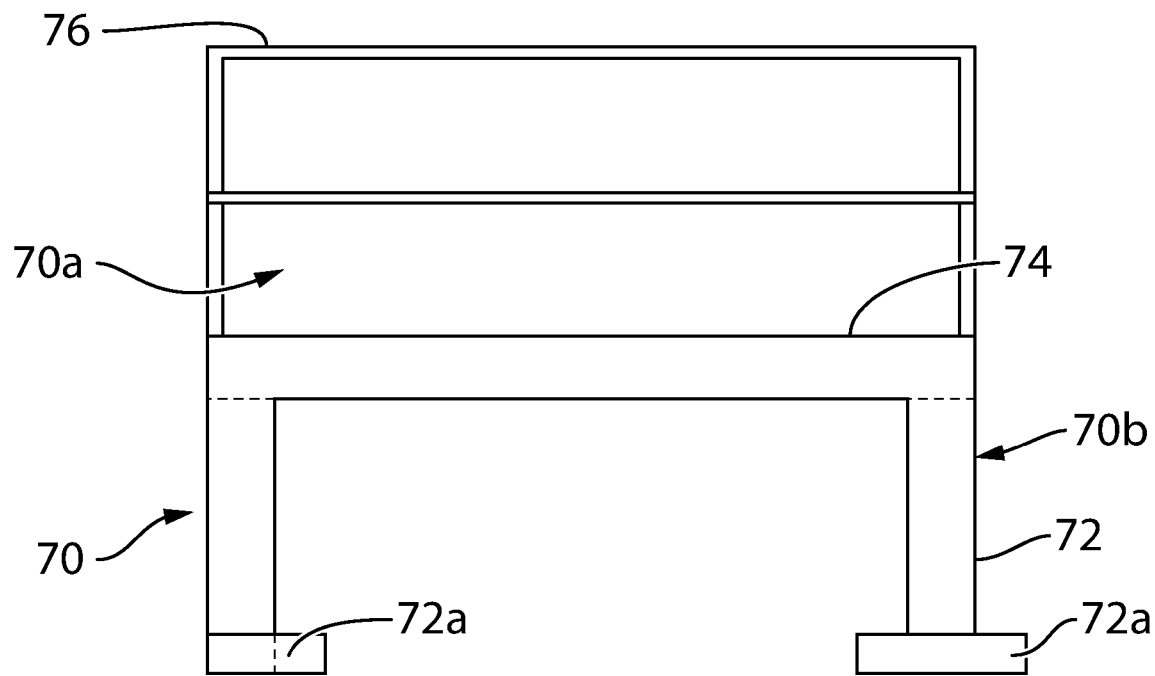
Figure 11B:
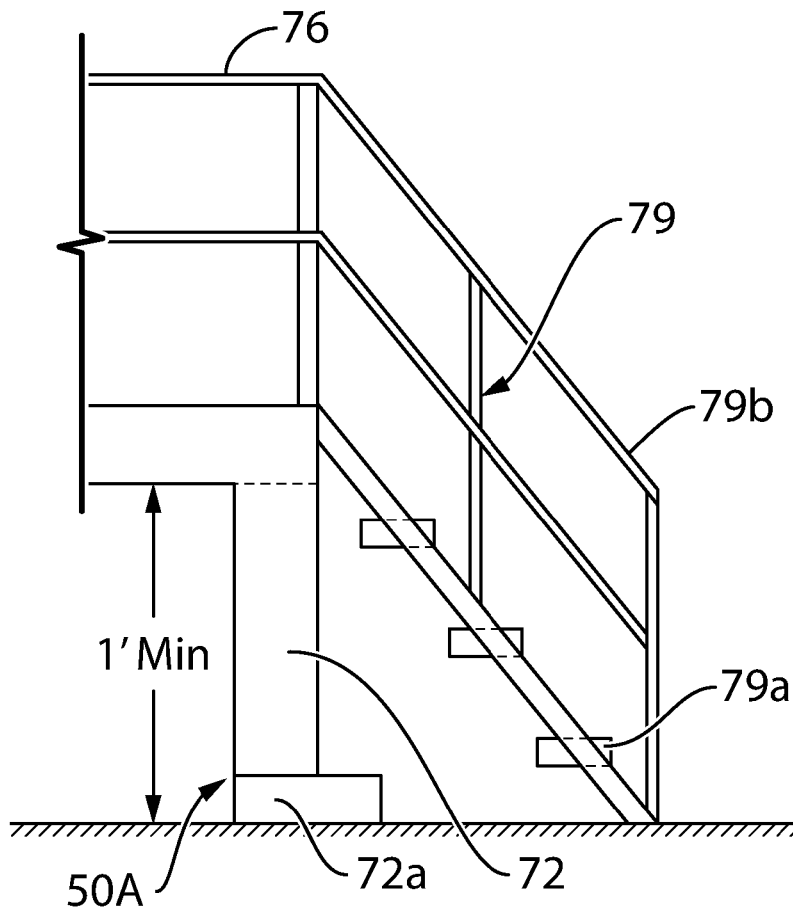

In one embodiment and with reference to FIGS. 11A and 11B, the insulated bridge 50A is a modular bridge having pre-fabricated bridge modules 70. In one embodiment, an individual module 70 may span the entire length of the bridge 50A. The modules may be shipped to a bridge site (for example, adjacent work area 3) and may be assembled on site. Assembly may include fastening the modules together using fasteners or interconnecting them using complementary interconnecting means provided on the modules.

In one embodiment and with reference to FIG. 11A, each bridge module 70 includes a deck section 70*a* supported on a structural support section 70*b*. The structural support section 70*b* includes one or more support legs 72 for properly supporting the deck section 70*a* and the persons and payload that may pass over the deck section. In one embodiment, in order to stabilize the support legs 72 on the work area 3, each support leg may have a foot member 72*a* at its distal, lower or free end. The foot member 72*a* is adapted to rest upon the work area 3. The deck section 70*a* has a floor 74 which is a substantially flat and continuous surface. In one embodiment, the deck section may include a handrail 76 extending, preferably, along the entire length of the deck section 70*a*.

In some implementations, it is contemplated that the deck section 70*a* and the support section 70*b* are two separate components, adapted to be connected to each other to attain a use configuration. In other implementations, the deck section and the support section may be constructed as a single piece.

In one embodiment and with reference to FIG. 11B, one or more bridge modules, typically end bridge modules, may be associated with a stairway 79. As with conventional stairways, stairway 79 includes foot treads 79*a* and handrails 79*b*.

Figure 12:
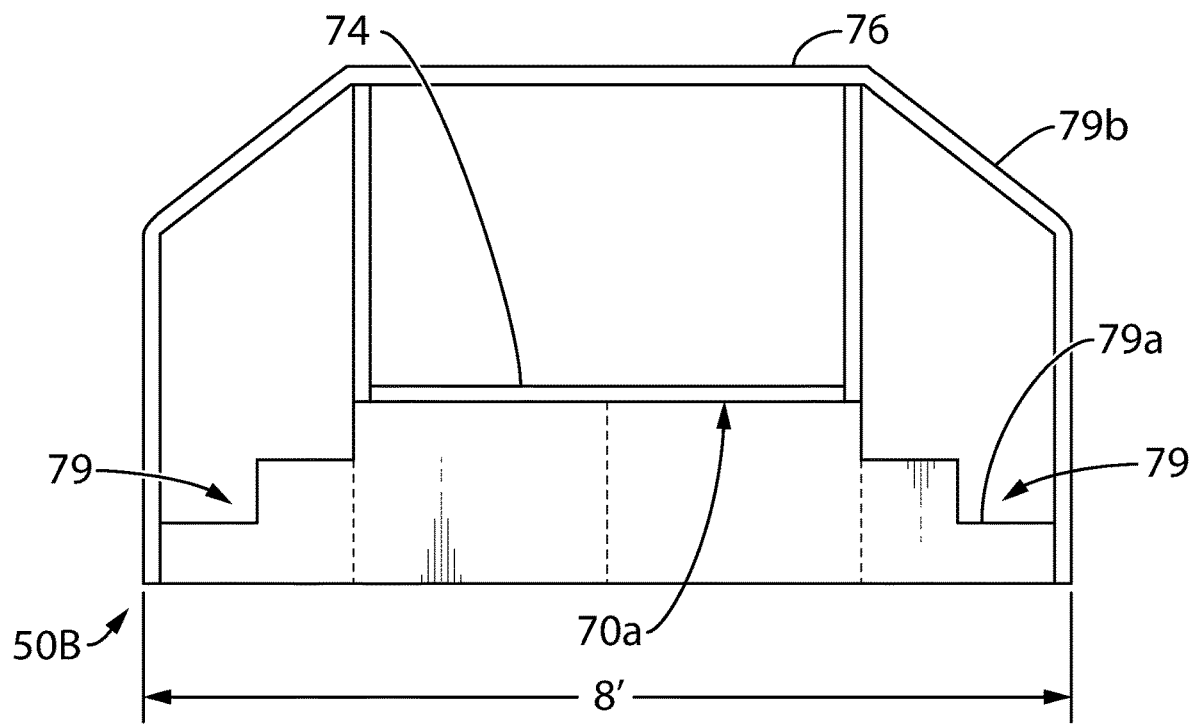
FIG. 12 is a side view of another embodiment of an insulated bridge associated with the equipotential zone of FIGS. 7A and 7B.

All the elements of the insulated bridge depicted in FIGS. 11A, 11B, and 12 including support legs 72, the deck section 70*a* and its various components, the stairway and its various components are made of electrically insulating materials or elements. For example, without intending to be limiting, insulating materials may include fiberglass, fiberglass reinforced plastic (FRP), thermoplastic polymeric materials such as polyvinylchloride (PVC). The insulated bridge 50 and its various components may be made of an insulating material generally used to construct live-line tools such as so-called hot sticks.

For ease of shipping, length of each bridge module 70 may be approximately four feet. Also, length of each support leg 72 including a thickness of the foot member 72*a* may be one foot. As one skilled in the art will appreciate, these dimensions may vary depending on a multitude of factors including size of the equipotential zone 1', its elevation from the work area 3, voltage levels of the energized power lines located in the vicinity of the equipotential zone 1' and such.

Figure 13A:
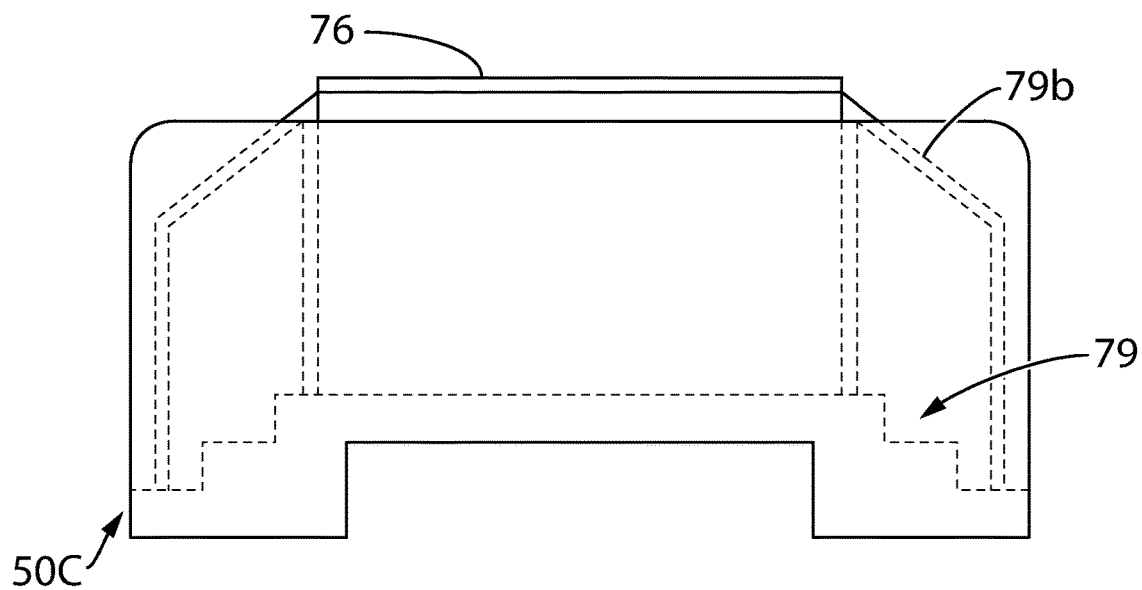
Figure 13B:
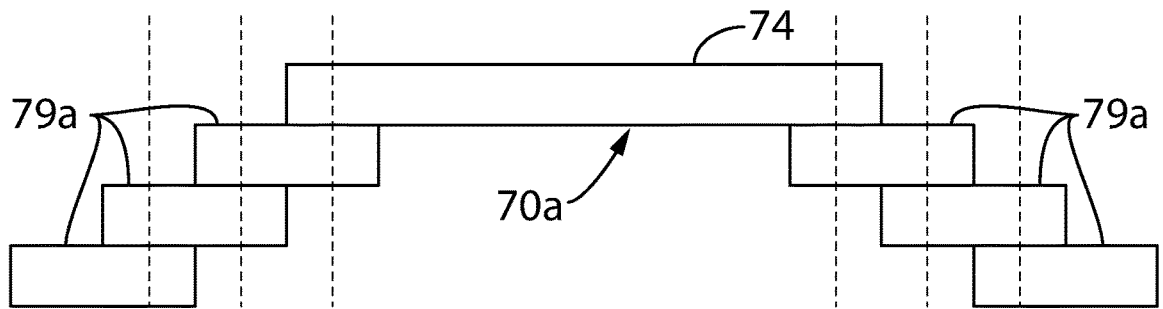
Figure 13C:
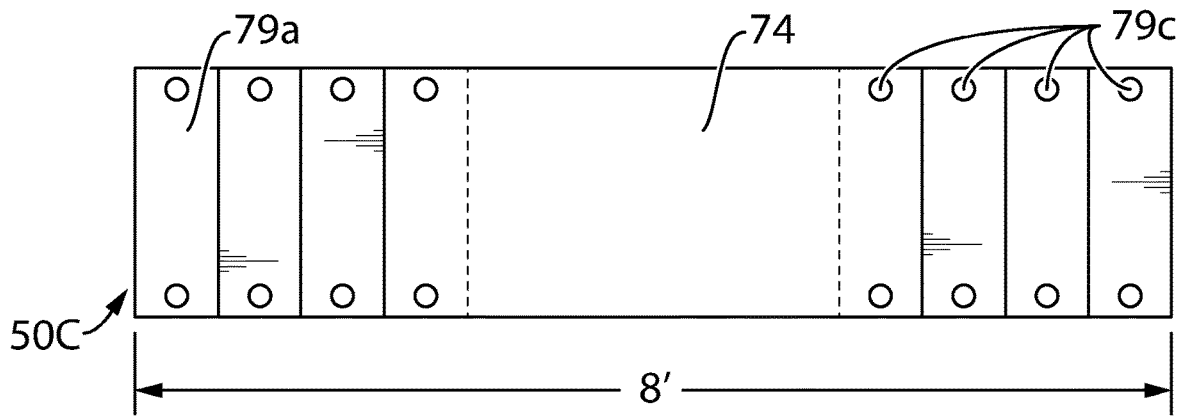
Figure 13D:
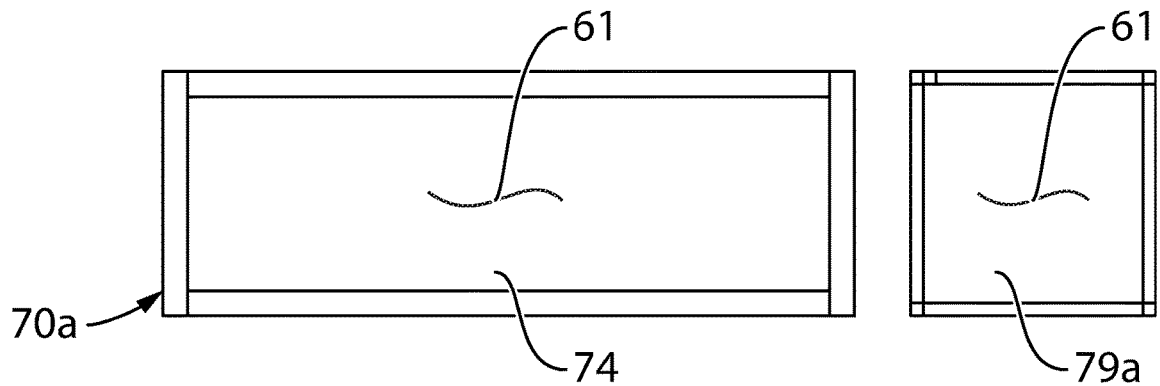

FIGS. 12 to 13D depict alternative embodiments of the insulated bridge 50.

With reference to FIG. 12, the insulated bridge 50B depicted therein is fabricated from plastic by a blow molding process. In order to reduce weight and render the bridge cost-effective, the bridge may have a hollow interior. Further, the bridge may be of a single piece construction or may be of a modular construction having one or more cooperating bridge modules/blocks. Further, the bridge may be associated with one or more stairways 79. Typically, the stairways 79 are associated with opposed ends of the bridge. In one implementation, the stairway(s) 79 may be integrally formed with a bridge module. In another implementation, the stairway(s) 79 may be a separate plastic, blow-molded unit that may be connected to one end of the bridge.

As with the embodiment depicted in FIGS. 11A and 11B, all components of the bridge 50B illustrated in FIG. 12 are also made of electrically insulating materials or elements.

In the event the bridge 50B of FIG. 12 is of a modular construction, in order to bridge discontinuities formed between connecting edges of adjacent bridge modules, the floor 74 of the deck section may be constructed as a single piece that is adapted to overlie the entire length of the deck section so as to form a substantially continuous surface.

Applicant, in one embodiment, has contemplated constructing the stairway 79 depicted in FIG. 12 as follows: constructing a stairway from a rigid form rendering structure such as plywood, creating a mold/shell around the plywood using a non-conductive material, removing the plywood to create a hollow shell in the substantial form of the stairway. Examples of the non-conductive material that may be used in the process include fiberglass, plastic, rubber (in the form of a spray or sheets). Applicant believes these insulating materials are capable of being moulded/formed/draped/sheeted around an underlying form rendering structure such as plywood.

FIGS. 13A to 13D illustrate another embodiment of the insulated bridge 50. In this embodiment, insulated bridge 50C includes blow-moulded bridge modules that may be interconnected to form bridge 50C. Alternatively, the bridge 50C may be constructed as a single piece by a blow molding process. Again, as with other embodiments, the bridge 50C may be associated with a stairway 79. In one implementation and with reference to FIG. 13B, the stairway 79 may be constructed as follows: frames or blocks that function as foot treads 79*a* are first constructed using electrically insulative materials. These frames or blocks are then interconnected using external connecting means or complementary interconnecting means provided on the frames or blocks to form a partial stairway 79. Each frame/foot tread 79*a* is further provided with mounting holes 79*c* on opposed ends thereof for receiving elongate members of the handrail 79*b*. Typically, each stairway 79 may have between two to eight foot treads 79*a*.

Further, with reference to FIG. 13D, in order to increase the insulative properties of the bridge 50C, the foot treads 79*a* and the floor 74 of the deck section 70*a* may additionally be covered by an electrically insulative material or fabric 61 such as rubber or other insulating materials. As described, fabric 61 can be removed during transport of the bridge and be laid on the said surfaces prior to use.

What is claimed is:

1. A mat for creating an equipotential zone on a work area in the vicinity of an energized power line, and for supporting thereon at least power line workers and/or related stringing equipment, the mat comprising:

a base member including an upper layer and a backing surface layer, an uppermost surface of the upper layer being adapted to support thereon the power line workers and/or related stringing equipment and the backing surface layer being adapted to be in contact with a surface of the work area, wherein at least the uppermost surface comprises a substantially uniform layer of an electrically conductive flexible composition, and wherein the composition comprises both a non-conductive flexible material and conductive particles which are embedded within the non-conductive flexible material in sufficient density to provide electrical conductivity across the uniform layer, and wherein an amount by volume of the conductive particles is higher than an amount by volume of the non-conductive flexible material.

2. The mat of claim 1, wherein the conductive particles are a conductive powder.

3. The mat claim of claim 1, wherein the non-conductive flexible material includes a synthetic resin.

4. The mat of claim 3, wherein the resin is selected from the group including polymers or polyesters.

5. The mat of claim 3, wherein the conductive particles comprises conductive flakes.

6. The mat of claim 5, wherein a ratio of the volume of resin to the volume of conductive flakes is substantially 1:2.5.

7. The mat of claim 1, wherein the conductive particles are selected from the group comprising; metal particles, metal filings, metal chips.

8. The mat of claim 1, wherein the conductive particles are carbon or graphite particles.

9. The mat of claim 1, wherein the composition is in the form of a stable formable setting paste.

10. The mat of claim 1 further comprising at least one locator mounted on the uppermost surface for releasably connecting an upright member to the uppermost surface.

11. The mat of claim 10, wherein the at least one locator is located around a periphery of the uppermost surface.

12. The mat of claim 1, wherein the base member includes a plurality of base members, and the mat further comprises at least one electrically conductive connector for mechanically and electrically connecting the plurality of base members.

13. The mat of claim 1, further comprising a conductive layer sandwiched between the upper layer and the backing surface layer and protruding from the upper layer to form at least a portion of the uppermost surface.

14. The mat of claim 1 further comprising a bridge adapted to extend from and over an edge of the base member onto an area outside of the equipotential zone, and wherein the bridge is made of an electrically insulating material.

15. The mat of claim 14, wherein the bridge further includes an upper layer of an electrically non-conductive fabric.

16. The mat of claim 15, wherein the bridge is modular in construction.

17. The mat of claim 16, wherein each module of the bridge includes a deck section supported on a support section, and wherein the electrically non-conductive fabric overlies a floor of the deck section.

18. The mat of claim 17, wherein the deck section and the support section are integrally formed as a single unit.

19. The mat of claim 17, wherein the deck section and the support section are separate components that are adapted to be connected together.

20. The mat of claim 15, wherein the bridge is associated with at least one stairway, and wherein the at least one stairway is made of an electrically insulating material.

21. The mat of claim 20, wherein the electrically non-conductive fabric overlies one or more foot treads of the at least one stairway.

22. The mat of claim 15, wherein the bridge is associated with at least one stairway, and wherein the at least one stairway is formed integrally with the bridge as a single unit.

23. The mat of claim 14, wherein the bridge is fabricated from plastic by a blow molding process.

24. An equipotential zone system, including a plurality of the mats of claim 1, for location on a work area in the vicinity of an energized power line for supporting power line workers and/or related stringing equipment thereon, the system further comprising:
the equipotential zone formed by interconnecting the plurality of mats in an edge-to-edge arrangement at their connecting edges;
at least one grounding element adapted to be coupled to the equipotential zone; and
at least one bonding cable adapted to be coupled to at least each of the mats and/or related stringing equipment, and
wherein electrical continuity between the interconnected mats is maintained at least through the electrically conductive flexible composition on the uppermost surfaces of the mats.

25. The system of claim 24 further comprising a bridge adapted to extend from the equipotential zone onto an area outside of the equipotential zone, and wherein the bridge is made of an electrically insulating material.

26. The system of claim 25, wherein the bridge further includes an upper layer of an electrically non-conductive fabric.

27. The system of claim 26, wherein the bridge is modular in construction.

28. The system of claim 27, wherein each module of the bridge includes a deck section supported on a support section, and wherein the electrically non-conductive fabric overlies a floor of the deck section.

29. The system of claim 28, wherein the deck section and the support section are integrally formed as a single unit.

30. The system of claim 28, wherein the deck section and the support section are separate components that are adapted to be connected together.

31. The system of claim 26, wherein the bridge is associated with at least one stairway, and wherein the at least one stairway is made of an electrically insulating material.

32. The system of claim 31, wherein the electrically non-conductive fabric overlies one or more foot treads of the at least one stairway.

33. The system of claim 26, wherein the bridge is associated with at least one stairway, and wherein the at least one stairway is formed integrally with the bridge as a single unit.

34. The system of claim 25, wherein the bridge is fabricated from plastic by a blow molding process.

35. A method for manufacturing the mat of claim 1, the method comprising:
providing the base member including the upper layer and the backing surface layer; and
forming the uppermost surface of the upper layer by applying to the upper layer a substantially uniform layer of the electrically conductive flexible composition.

36. The method of claim 35 further comprising; sandwiching a conductive layer between the upper layer and the backing surface layer such that the conductive layer protrudes from the upper layer; and applying the electrically conductive flexible composition on the conductive layer protruding from the upper layer to form the uppermost surface.

37. A method for manufacturing the mat of claim 1 comprising:
providing the base member including the upper surface layer and the backing surface layer; and
forming the uppermost surface of the upper layer by operatively coupling an electrically conductive material or fabric to the upper layer of the base member, wherein the electrically conductive material or fabric comprises the electrically conductive flexible composition.

38. The method of claim 37, wherein the step of operatively coupling comprises adhering the conductive fabric to the upper layer.

39. The method of claim 37, wherein the step of operatively coupling comprises attaching the conductive fabric to the upper layer by one or more fasteners.

40. The mat of claim 1, wherein the base member is manufactured of one or more materials selected from the group comprising: composite, plastic, fiberglass, plywood, wood chips, plywood coated with fiberglass, wood, fiberglass composite, silicon, rubber, vulcanized rubber, aluminum, fiber-reinforced plastic, high density polyethylene.

41. The mat of claim 1, wherein the backing surface layer is manufactured of one or more materials selected from the group comprising: composite, plastic, fiberglass, plywood, wood chips, plywood coated with fiberglass, wood, fiberglass composite, silicon, rubber, vulcanized rubber, aluminum, fiber-reinforced plastic, high density polyethylene.

* * * * *